(12) United States Patent
Nakayama

(10) Patent No.: US 9,734,395 B2
(45) Date of Patent: Aug. 15, 2017

(54) TRACKING DEVICE AND TRACKING METHOD

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/536,936

(22) Filed: Nov. 10, 2014

(65) Prior Publication Data

US 2015/0131858 A1    May 14, 2015

(30) Foreign Application Priority Data

Nov. 13, 2013  (JP) ................. 2013-235363

(51) Int. Cl.
  *G06K 9/00*  (2006.01)
  *G06K 9/46*  (2006.01)
  *G06K 9/62*  (2006.01)

(52) U.S. Cl.
  CPC ....... *G06K 9/00624* (2013.01); *G06K 9/4604* (2013.01); *G06K 9/4609* (2013.01); *G06K 9/6202* (2013.01); *G06K 9/6215* (2013.01)

(58) Field of Classification Search
  CPC ......... G06T 2207/10016; G06T 7/0044; G06T 7/2033; G06K 9/6202; G06K 9/6215
  See application file for complete search history.

(56) References Cited

U.S. PATENT DOCUMENTS

| 8,582,821 | B1 * | 11/2013 | Feldman ................. G06T 7/204 348/169 |
| 2002/0135681 | A1 * | 9/2002 | Lo ......................... G01S 3/7864 348/208.7 |

(Continued)

FOREIGN PATENT DOCUMENTS

| JP | 8-249466 | 9/1996 |
| JP | 2009-87238 | 4/2009 |

(Continued)

OTHER PUBLICATIONS

Extended European Search Report issued Jan. 8, 2016 in corresponding European Patent Application No. 14192634.5.

(Continued)

*Primary Examiner* — Jonathan S Lee
(74) *Attorney, Agent, or Firm* — Staas & Halsey LLP

(57) ABSTRACT

A non-transitory computer-readable medium storing a program for tracking a feature point in an image that causes a computer to execute a process, the process includes: calculating first values indicating degree of corner for respective pixels in another image, based on change of brightness values in horizontal direction and vertical direction; calculating second values indicating degree of similarity between respective areas in the another image and a reference area around the feature point in the image, based on comparison between the respective areas and the reference area; calculating third values indicating overall degree of corner and similarity, based on the first values and the second values; and tracking the feature point by identifying a point in the another image corresponding to the feature point in the image, based on the third values.

16 Claims, 37 Drawing Sheets

(56) References Cited

U.S. PATENT DOCUMENTS

| | | | | |
|---|---|---|---|---|
| 2004/0090444 | A1* | 5/2004 | Satoh | G06T 7/0044 345/633 |
| 2004/0100563 | A1* | 5/2004 | Sablak | H04N 5/77 348/211.4 |
| 2005/0002570 | A1* | 1/2005 | Clark | G06K 9/4609 382/199 |
| 2005/0238198 | A1* | 10/2005 | Brown | G06K 9/4609 382/103 |
| 2006/0182339 | A1* | 8/2006 | Connell | G06K 9/38 382/170 |
| 2007/0147684 | A1* | 6/2007 | Loce | G06K 9/00986 382/199 |
| 2007/0147699 | A1* | 6/2007 | Loce | G06K 9/4609 382/266 |
| 2008/0192998 | A1* | 8/2008 | Takeguchi | G06K 9/48 382/128 |
| 2008/0273752 | A1* | 11/2008 | Zhu | B60W 40/02 382/103 |
| 2010/0074531 | A1* | 3/2010 | Tanaka | G06K 9/3216 382/201 |
| 2010/0322474 | A1* | 12/2010 | Cheriyadat | G06K 9/00778 382/103 |
| 2012/0134576 | A1* | 5/2012 | Sharma | G06K 9/4604 382/155 |
| 2015/0172626 | A1* | 6/2015 | Martini | G06T 7/0008 348/50 |
| 2016/0284099 | A1* | 9/2016 | Swaminathan | G06T 7/0042 |

FOREIGN PATENT DOCUMENTS

| | | |
|---|---|---|
| JP | 2010-39617 | 2/2010 |
| JP | 2011-170554 | 9/2011 |

OTHER PUBLICATIONS

Meghna Singh et al., "Gaussian and Laplacian of Gaussian weighting functions for robust feature based tracking", Pattern Recognition Letters 26 (2005) 1995-2005, Oct. 1, 2005, XP025292320.

Carlo Tomasi et al., "Shape and Motion from Image Streams: a Factorization Method—Part 3, Detection and Tracking of Point Features", Technical Report CMU-CS-91-132, Apr. 1, 1991, XP055206515, pp. 1-38.

"KLT: An Implementation of the Kanade-Lucas-Tomasi Feature Tracker", Oct. 26, 2008; https://web.archive.org/web/20081026114613/http://www.ces.clemson.edu/~stb/klt/; XP055236733.

Ichimura, "Feature point tracking based on feature point extraction in every frame", IPSJ SIG Technical Reports, 2001-CVIM-130, vol. 2001, No. 105, Information Processing Society of Japan, Nov. 8, 2001, pp. 31-38.

Kato et al., "Motion compensated predictive coding method based on equal density region", The Journal Of The Institute Of Image Electronics Engineers Of Japan, vol. 23 No. 3, The Institute of Image Electronics Engineers of Japan, Jun. 25, 1994, pp. 157-166.

Japanese Office Action dated May 23, 2017 in corresponding Japanese Patent Application No. 2013-235363.

* cited by examiner

|   | a |   |   |
|---|---|---|---|
|   | -1 | 0 | 1 |
| b -1 | -1 | -2 | -1 |
| 0 | 0 | 0 | 0 |
| 1 | 1 | 2 | 1 |

FIG. 7

| NEW CORNER POINT NLIST | | |
|---|---|---|
| NUMBER | x COORDINATE | y COORDINATE |
| 1 | Px1 | Py1 |
| 2 | Px2 | Py2 |
| ... | ... | ... |
| NM | PxNN | PyNN |

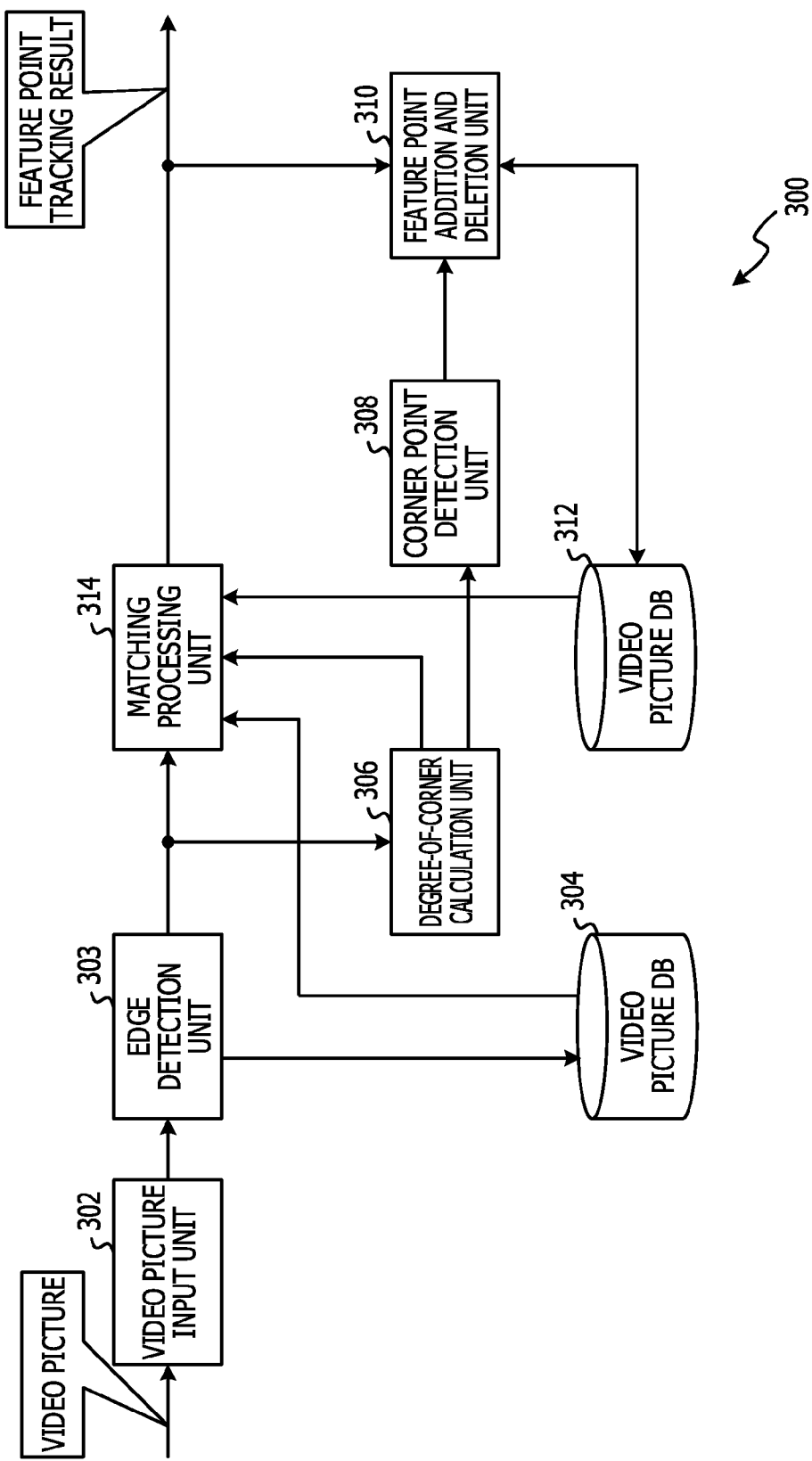

TRACKING DEVICE AND TRACKING METHOD

CROSS-REFERENCE TO RELATED APPLICATION

This application is based upon and claims the benefit of priority form the prior Japanese Patent Application No. 2013-235363 filed on Nov. 13, 2013, the entire contents of which are incorporated herein by reference.

FIELD

The embodiments discussed herein are related to a technique for tracking a feature point.

BACKGROUND

There has been a technique for extracting a feature point from a video picture image-captured using a camera attached to a moving object and tracking the position of the feature point from time-series video pictures.

As an image processing method for tracking a moving object, the following method has been known. For example, in Japanese Laid-open Patent Publication No. 2010-039617, feature points are extracted from a video picture at first time, and small areas centered at the respective obtained feature points are set. As for a video picture at each instant of time at or after second time, matching utilizing the similarity (coincidence) of a video picture brightness pattern in each individual small area is performed, and thus, tracking of the feature point defined at the first time (a first method). Usually, the feature point is a corner point indicating the corner of an object in order to accurately perform tracking.

In addition, an image processing method (a second method) in which, as for a video picture at each instant of time of a time series, a corner point (feature point) is extracted in advance, a small area centered at the corner point is provided while targeting the corner point, matching is performed using the similarity of a video picture brightness pattern within the small area, and tracking is performed has been known.

SUMMARY

According to an aspect of the invention, a non-transitory computer-readable medium storing a program for tracking a feature point in an image that causes a computer to execute a process, the process includes: calculating first values indicating degree of corner for respective pixels in another image, based on change of brightness values in horizontal direction and vertical direction; calculating second values indicating degree of similarity between respective areas in the another image and a reference area around the feature point in the image, based on comparison between the respective areas and the reference area; calculating third values indicating overall degree of corner and similarity, based on the first values and the second values; and tracking the feature point by identifying a point in the another image corresponding to the feature point in the image, based on the third values.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a horizontal differential operator of Sobel;

FIG. 6 is a diagram illustrating an example of a vertical differential operator of Sobel;

FIG. 7 is a diagram illustrating an example of a new corner point list NLIST;

FIG. 34 is a diagram illustrating an example of a configuration of a feature point tracking device of an embodiment 3;

DESCRIPTION OF EMBODIMENTS

Figure 1:
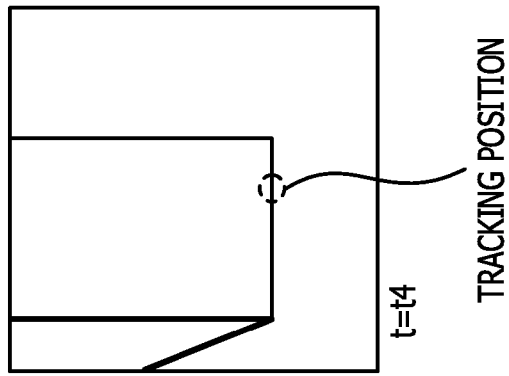
FIGS. 1A, 1B, 1C, and 1D are diagrams each illustrating a relationship between a feature point and a tracking position based on a related art.

In the first method, the feature point is defined at the first time, and tracking is performed at time at or after the second time, using the similarity of a video picture brightness pattern in the small area. Therefore, in tracking over a long time period, in association with the movement of the moving object, a relative positional relationship with a camera between a target object and the moving object changes in some cases. Owing to this, the visibility of the brightness video picture pattern in the small area gradually changes, and the center position (tracking position) of the small area being tracked deviates from the position of the feature point defined at the first time, in some cases. As a result, there has been a problem that the tracking position gradually deviates.

FIGS. 1A, 1B, 1C, and 1D are diagrams each illustrating a relationship between a feature point and a tracking position based on a related art. In the examples of FIGS. 1A, 1B, 1C and 1D, an image at time t1, an image at time t2, an image at time t3, and an image at time t4 are illustrated. Here, $t1<t2<t3<t4$ is satisfied. In the examples of FIG. 1, portions of a rectangular parallelepiped-shaped object appear in the images. In the image at the time t=t1, one of corners of the rectangular parallelepiped is defined as the feature point. In the examples of FIG. 1, since tracking is performed based on the degree of coincidence of an image, the tracking position gradually deviates from the position of the corner of the rectangular parallelepiped serving as the feature point.

In addition, in the second method, matching is performed while targeting the corner point (feature point) defined in advance. Therefore, in a tracking result obtained by the matching, a problem that the tracking position deviates in a time-series manner does not occur. However, in general, whether or not the corner point is obtained is sensitive to a change in a surrounding brightness pattern, and if the visibility of the target object changes in association with the movement of the moving object, the surrounding brightness pattern changes, and it becomes difficult to obtain the corner point, in many cases. The corner point is defined as a point where the degree of corner in a small area centered at a position of interest becomes a local maximum. The degree of corner is defined from the horizontal direction differential value and the vertical direction differential value of a brightness video picture within the small area centered at the position of interest. In order to define a stable corner point, it is desired to define the size of the small area surrounding the position of interest as a large size, and if a change occurs in the visibility, the differential value of a brightness video picture greatly fluctuates. Therefore, the degree of corner defined from the differential values of a starting video picture within the small area sensitively changes. Furthermore, the degree of corner of the detected corner point does not indicate a local maximum, and it becomes hard to detect the corner point. Therefore, in a case where tracking is performed over a long time period while the moving object moves, it becomes difficult to obtain the corner point on the way, and the tracking fails, in some cases.

An object one embodiment of the present technology addresses is to perform more accurate tracking in a case where the position of a feature point is tracked from time-series video pictures.

Hereinafter, embodiments will be described with reference to drawings. The configurations of the embodiments are exemplifications, and the disclosed configurations are not limited to the specific configurations of the disclosed embodiments. When the disclosed configurations are implemented, specific configurations corresponding to the embodiments may be arbitrarily adopted.

Embodiment 1

In an image, even if a condition that a characteristic as a corner point, in other words, the degree of corner locally has a local maximum value is not satisfied, a portion forming the corner of an object has a high value as the degree of corner. Therefore, in a method of the present embodiment, in tracking of a feature point, a point in which, in addition to the coincidence of a brightness pattern within a small area centered at a position of interest, the degree of corner indicates a high value within the small area is defined as a first-best coincidence point. In matching based on the coincidence of a brightness pattern of the related art, there is no mechanism for tracking an original feature point (corner point) with no position deviation. In contrast to this, in the method of the present embodiment, by taking it into account that the degree of corner is high in addition to the coincidence of an image, a characteristic as a corner serving as a criterion of selecting an original feature point is ensured, and a deviation from the corner point is suppressed as a tracking result.

The method of the present embodiment is characterized in that not a distribution pattern of the degree of corner within a small area but a degree-of-corner value at each matching center position is used for ensuring a characteristic of being a corner. The reason is that since the distribution of the degree of corner sensitively changes in association with a change in the visibility of a target object, the pattern coincidence of an image is not high even at a position really corresponding.

Specifically, first, feature points (corner points) are defined from a video picture at time (defined as time t1). In the present embodiment, a degree-of-corner distribution is defined while targeting a video picture at time t2 (t2>t1), and scanning is performed within a video picture at the current time (time t2) with respect to each feature point at the preceding time (time t1). In addition, it is assumed that a coincidence between a video picture pattern within a small area centered at a feature point position at the preceding time and a video picture pattern within a small area centered at each scanning position at the current time is S1. In addition, it is assumed that the product of a degree-of-corner value at a scanning position and the degree S1 of coincidence is the degree S2 of overall coincidence. As a result of scanning, a point where the degree S2 of overall coincidence becomes the highest is defined as a first-best coincidence point, and tracking of the feature points is performed.

Example of Configuration

Figure 2:
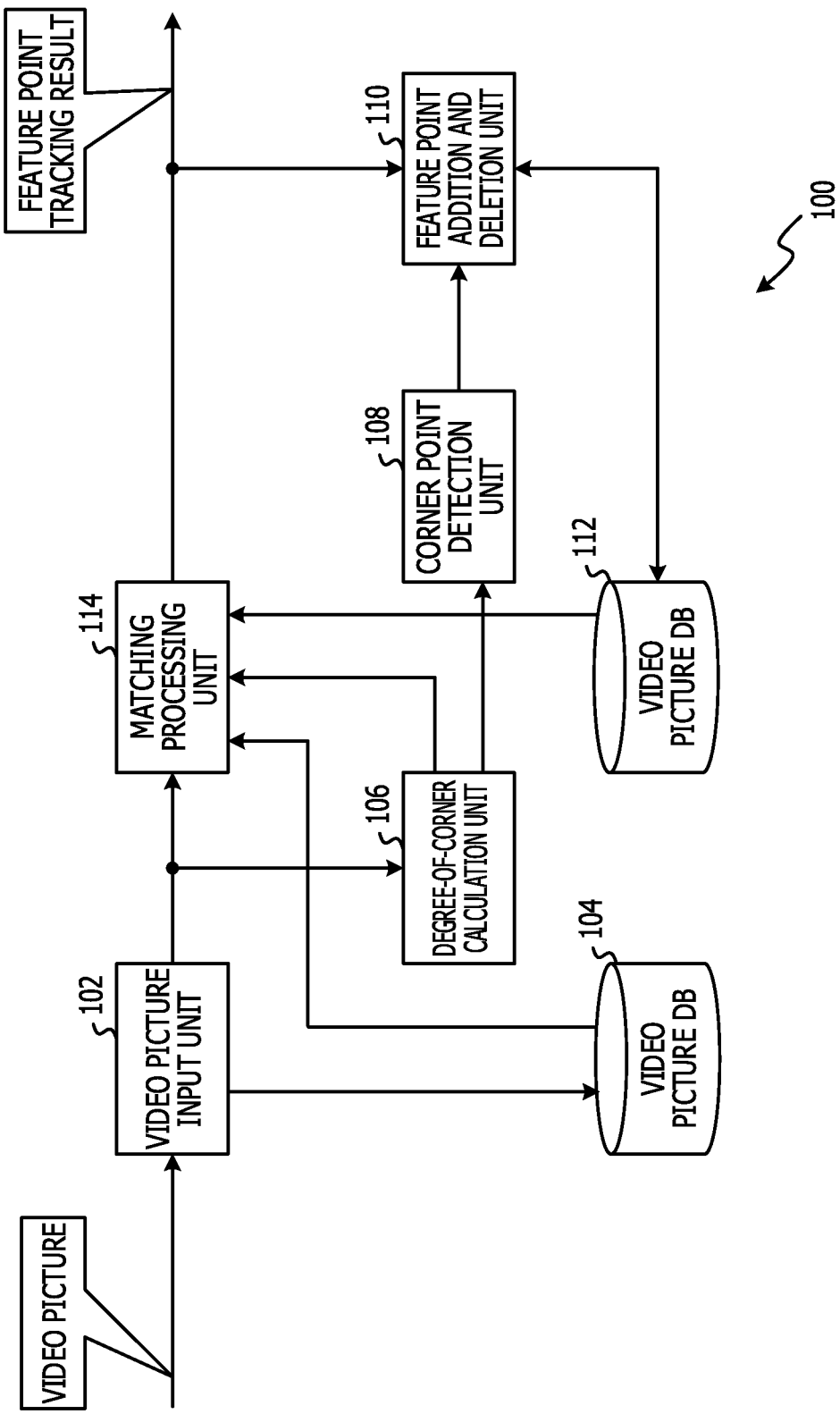
FIG. 2 is a diagram illustrating an example of a configuration of a feature point tracking device of an embodiment 1.

FIG. 2 is a diagram illustrating an example of the configuration of a feature point tracking device of the embodiment 1. A feature point tracking device 100 includes a video picture input unit 102, a video picture DB (Data Base: database) 104, a degree-of-corner calculation unit 106, a corner point detection unit 108, a feature point addition and deletion unit 110, a feature point DB 112, and a matching processing unit 114.

The video picture input unit 102 inputs an external video picture image-captured by a camera, converts the external video picture into desired digital video picture data, and sends the digital video picture data to the degree-of-corner calculation unit 106, the matching processing unit 114, and the video picture DB 104.

The video picture DB 104 holds video picture data at current time, and video picture data preceding by one period of time. One period of time is, for example, 1/30 seconds in video picture data whose frame rate is 30 frames/second.

The degree-of-corner calculation unit 106 calculates, from the video picture data, the distribution of the degree of corner indicating the likelihood of being a corner at each position in a video picture, and outputs the distribution of the degree of corner to the corner point detection unit 108 and the matching processing unit 114.

The corner point detection unit 108 extracts a corner point (feature point) using the degree-of-corner distribution as an input.

The feature point addition and deletion unit 110 adds a new feature point from a feature point sequence extracted from the video picture data at the current time and previous feature points stored in the feature point DB 112 prior to time preceding by one period of time, and deletes a point unsuitable for tracking.

The feature point DB 112 stores therein a tracked feature point.

Using a video picture at the current time, a video picture that is held in the video picture DB 104 and precedes by one period of time, individual feature points of the video picture that is held in the feature point DB 112 and precedes by one period of time, and the degree-of-corner distribution of the video picture at the current time, the matching processing unit 114 performs matching processing, and thus performs tracking of a feature point.

The feature point tracking device 100 outputs, to the outside, a tracking result (the position of a feature point within an image) obtained by tracking the feature point within a video picture in a time-series manner.

The feature point tracking device 100 is able to be realized using a general-purpose computer such as a personal computer (PC: Personal Computer) or a dedicated computer such as a server machine. In addition, the feature point tracking device 100 is able to be realized using a dedicated or general-purpose computer such as a work station (WS: Work Station) or a PDA (Personal Digital Assistant), or an electronic device equipped with a computer. In addition, the feature point tracking device 100 is able to be realized using a dedicated or general-purpose computer such as a smartphone, a mobile phone, or a car navigation device, or an electronic device equipped with a computer. The car navigation device is installed in, for example, an automobile or the like.

Figure 3:
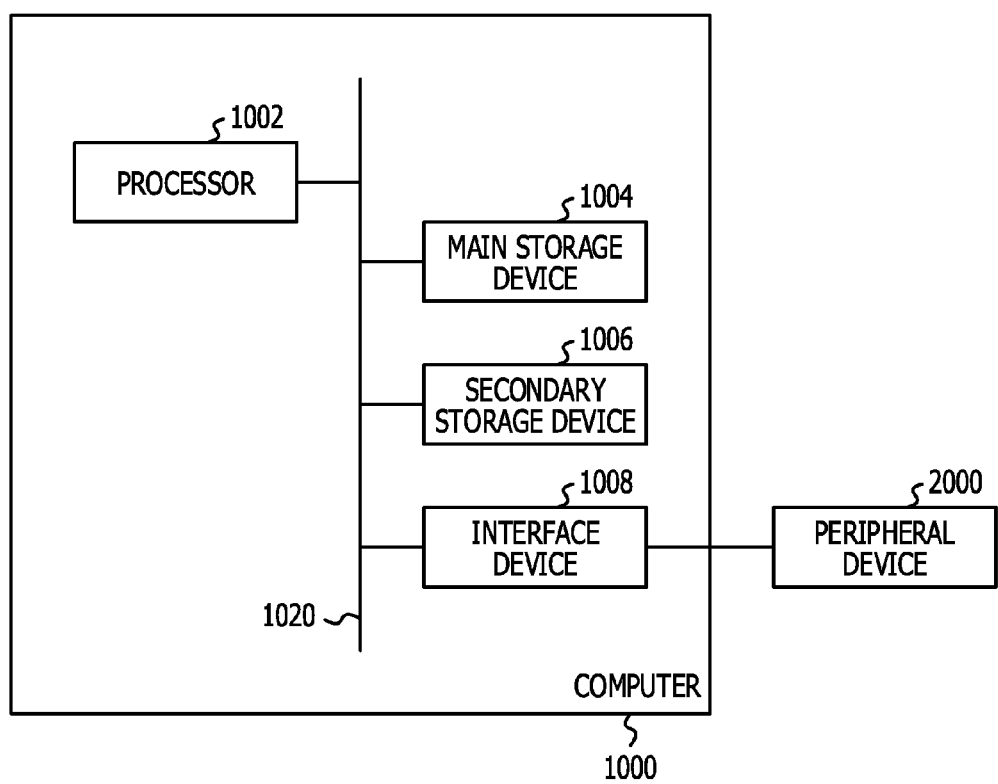
FIG. 3 is a diagram illustrating an example of a computer for realizing a feature point tracking device.

FIG. 3 is a diagram illustrating an example of a computer for realizing a feature point tracking device. A computer 1000 in FIG. 3 includes a processor 1002, a main storage device 1004, a secondary storage device 1006, and an interface device 1008 with a peripheral device 2000, such as a communication interface device. The main storage device 1004 and the secondary storage device 1006 are computer-readable recording media.

A processor loads a program stored in a recording medium into a work area of the main storage device 1004, and executes the program, and peripheral devices are controlled through the execution of the program. Accordingly, the computer 1000 is able to realize a function consistent with a predetermined purpose.

The processor 1002 is, for example, a CPU (Central Processing Unit) or a DSP (Digital Signal Processor). The main storage device 1004 includes, for example, a RAM (Random Access Memory) or a ROM (Read Only Memory).

The secondary storage device 1006 is, for example, an EPROM (Erasable Programmable ROM) or a hard disk drive (HDD: Hard Disk Drive). In addition, the secondary storage device 1006 may include a removable medium, in other words, a portable recording medium. The removable medium is, for example, a USB (Universal Serial Bus) memory, or a disk recording medium such as a CD (Compact Disc) or a DVD (Digital Versatile Disc).

The interface device 1008 is, for example, a LAN (Local Area Network) interface board, or a wireless communication circuit for wireless communication.

In addition to the secondary storage device and the communication interface device, described above, the peripheral device 2000 includes an input device such as a keyboard or a pointing device, and an output device such as a display device or a printer. In addition, the input device may include an input device such as a camera, used for a video picture or an image, or an input device such as a microphone, used for audio. In addition, the output device may include an output device such as a speaker, used for audio. The camera is, for example, a camera installed in an automobile or the like.

A processor loads a program stored in the secondary storage device into the main storage device and executes the program, and thus, the computer for realizing the feature point tracking device 100 realizes functions as the video picture input unit 102, the degree-of-corner calculation unit 106, the corner point detection unit 108, the feature point addition and deletion unit 110, and the matching processing unit 114. On the other hand, the video picture DB 104 and the feature point DB 112 are provided in the storage area of the main storage device or the secondary storage device.

Individual units in the feature point tracking device 100 may be individually realized as configuration elements of hardware, configuration elements of software, or combinations thereof.

The configuration elements of hardware are hardware circuits, and, for example, an FPGA (Field Programmable Gate Array), an application specific integrated circuit (ASIC), a gate array, a combination of logical gates, an analog circuit, and so forth may be cited.

The configuration elements of software are components for realizing predetermined processing operations as software. The configuration elements of software are not concepts that limit languages for realizing software, development environments, or the like.

In addition to processing operations performed in a time-series manner in a described order, steps for describing a program may include processing operations executed in parallel or individually even if the processing operations are not processed in a time-series manner.

Example of Operation

Figure 4:
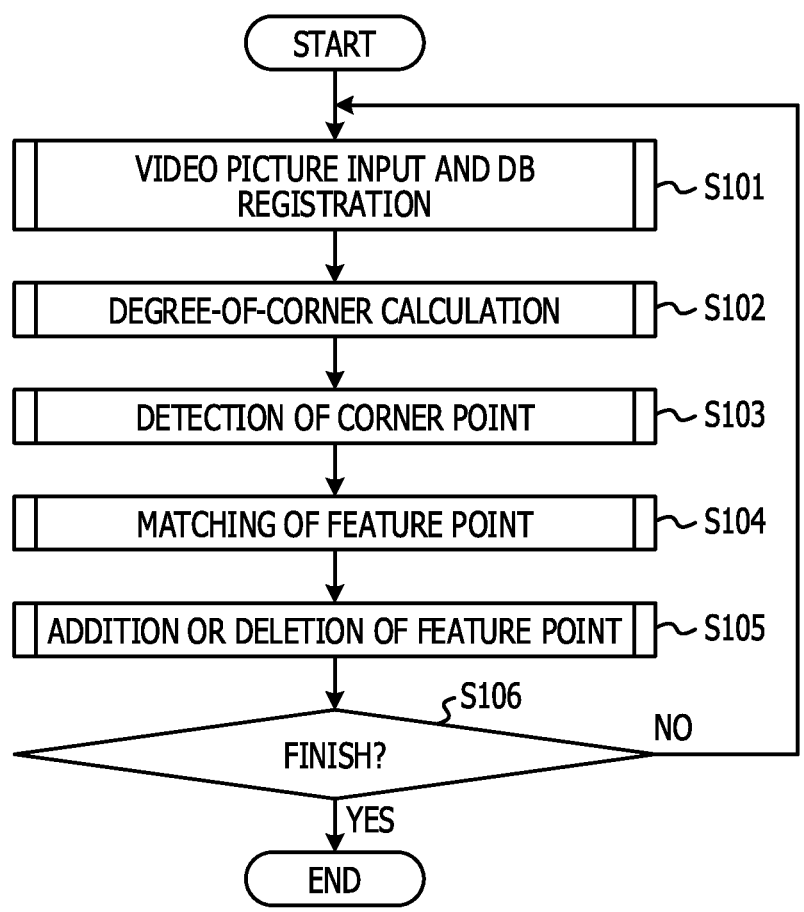
FIG. 4 is a diagram illustrating an example of an operation flow of tracking processing in a time series in a feature point tracking device 100.

FIG. 4 is a diagram illustrating an example of the operation flow of tracking processing in a time series in the feature point tracking device 100.

In a step S101, the video picture input unit 102 in the feature point tracking device 100 acquires a video picture from a camera or the like that image-captures an external world, converts the video picture into a digital video picture, registers a video picture at current time in the video picture DB 104, and outputs the digital video picture to a next-step processing operation.

In a step S102, the degree-of-corner calculation unit 106 calculates, from a digital video picture at the current time, the degree of corner indicating the likelihood of being a corner at each position within the video picture, and generates a degree-of-corner distribution. The generated degree-of-corner distribution is sent to the corner point detection unit 108 and the matching processing unit 114.

In a step S103, using the degree-of-corner distribution, the corner point detection unit 108 identifies a point where the degree of corner locally becomes a local maximum, and sends, as a corner point, the identified point to next-stage processing.

In a step S104, the matching processing unit 114 acquires, as video picture information, an input video picture at the current time and a video picture that is held in the video picture DB and precedes by one period of time, and acquires a degree-of-corner distribution obtained in the previous stage processing and tracking feature point information that is held in the feature point DB 112 and prior to time preceding by one period of time. Using the acquired information, the matching processing unit 114 calculates a corresponding position at the current time with respect to a tracking feature point preceding by one period of time, outputs, as a device output, a tracking position (the coordinate values of an image) to the outside of the device, and outputs a tracking result to subsequent stage processing.

The step S103 and the step S104 may be executed in parallel, and the step S104 may be executed in advance.

In a step S105, using, as inputs, a feature point sequence obtained at the current time and obtained in the step S103, and a tracking feature point sequence at the current time, obtained in the step S104, the feature point addition and deletion unit 110 updates the feature point DB 112 by adding a new feature point and deleting a feature point unsuitable for tracking, and prepares for matching processing at subsequent time.

In a step S106, the feature point tracking device 100 determines whether or not inputting of a video picture finishes. In a case where the inputting of a video picture finishes (S106: YES), the processing is terminated. In a case where the inputting of a video picture does not finish (S106: NO), the processing returns to the step S101 and is repeated.

Next, individual processing operations of the operation flow in FIG. 4 will be described in detail.

The video picture input unit 102 performs video picture input•DB registration processing. The video picture input unit 102 converts a sequentially input video picture into a desired digital format video picture (digital video picture data), and registers the digital format video picture in the video picture DB 104. The video picture input unit 102 outputs the digital format video picture to subsequent stage processing. The video picture DB 104 holds pieces of video picture data at two times. In other words, the video picture DB 104 holds video picture data at the current time and video picture data preceding by one period of time. The video picture input unit 102 discards the video picture data "preceding by one period of time" at that point in time, which exists within the video picture DB 104, and moves the video picture data at "the current time" at that point in time within the video picture DB 104, to the video picture data "preceding by one period of time" within the video picture DB 104. Furthermore, the video picture input unit 102 stores new video picture data input at the current time, as video picture data at "the current time" within the video picture DB 104.

In addition, the desired digital format video picture indicates a video picture suitable for calculation of the degree of corner in a subsequent stage, and is, for example, grid-like video picture data having a 8-bit monochrome tone at each position (pixel) in an image.

Using monochrome video picture data as an input, the degree-of-corner calculation unit 106 calculates the degree of corner indicating the degree of the likelihood of being a corner, at each pixel position.

The degree-of-corner calculation unit 106 performs differential processing in the vertical direction and the horizontal direction of a video picture, on each point within an image. While centering around each pixel position within the image, the degree-of-corner calculation unit 106 causes respective differential operators in the vertical direction and the horizontal direction, such as, for example, a Sobel operator, to operate, and calculates differential values in the horizontal direction and the vertical direction (defined as dx(x,y) and dy(x,y), respectively) for each pixel position (x,y). Specifically, in a case where it is assumed that an input image is I(x,y), the horizontal direction differential operator of Sobel is fx(a,b), and the vertical direction differential operator thereof is fy(a,b), the horizontal differential value dx(x,y) and the vertical differential value dy(x,y) at each position (x,y) in the image are obtained in accordance with the following Expressions.

$$dx(x, y) = \sum_{a=-1}^{1} \sum_{b=-1}^{1} (I(x+a, y+b) \cdot fx(a, b)) \quad \text{[Math. 1]}$$

-continued $$dy(x, y) = \sum_{a=-1}^{1} \sum_{b=-1}^{1} (I(x+a, y+b) \cdot fy(a, b))$$ [Math. 2]

Figure 5:
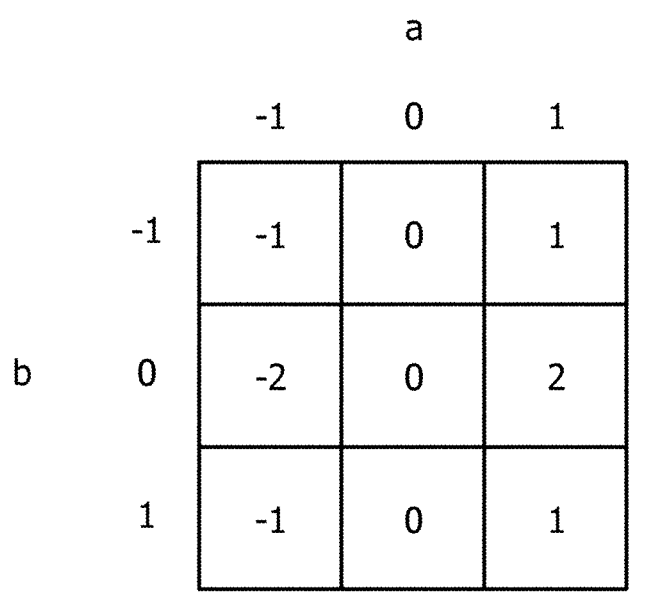

FIG. 5 is a diagram illustrating an example of the horizontal differential operator of Sobel. The horizontal differential operator fx(a,b) of Sobel is defined by 3×3 of −1≤a≤1 and −1≤b≤1, and has such coefficients as illustrated in FIG. 5.

Figure 6:
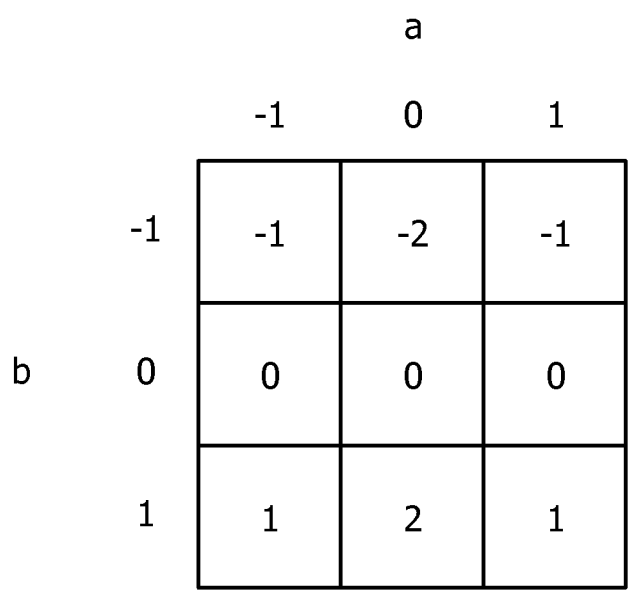

FIG. 6 is a diagram illustrating an example of the vertical differential operator of Sobel. The vertical differential operator fy(a,b) of Sobel is defined by 3×3 of −1≤a≤1 and −1≤b≤1, and has such coefficients as illustrated in FIG. 6.

In this regard, however, it is desirable that dx(x,y) and dy(x,y) are differential quantities at each pixel position in a video picture, and an operator other than the Sobel operator may be used.

Next, the degree-of-corner calculation unit 106 calculates the local integral quantities of differential values. With respect to the position of each point (x,y) in the image, the degree-of-corner calculation unit 106 calculates the following three variable quantities (g11,g12,g22) as the integrated values of a rectangular area of N×N. In this regard, however, it is assumed that N is an odd value and N=2×n+1 is satisfied. In other words, n indicates a size equivalent to ½ of the size of one side of the rectangular area. As an example, n=2 and N=5 are cited. In this regard, however, the sizes of n and N are not limited to these.

$$g11(x, y) = \sum_{a=-n}^{n} \sum_{b=-n}^{n} (dx(x+a, y+b) \cdot dx(x+a, y+b))$$ [Math. 3]

$$g12(x, y) = \sum_{a=-n}^{n} \sum_{b=-n}^{n} (dx(x+a, y+b) \cdot dy(x+a, y+b))$$ [Math. 4]

$$g22(x, y) = \sum_{a=-n}^{n} \sum_{b=-n}^{n} (dy(x+a, y+b) \cdot dy(x+a, y+b))$$ [Math. 5]

Using the three variable quantities (g11,g12,g22), the degree-of-corner calculation unit 106 calculates the degree of corner C(x,y) with respect to the position of each point (x,y) in the image, as follows.

$$C(x, y) = \frac{g11(x, y) + g22(x, y) - \sqrt{(g11(x, y) - g22(x, y))^2 + (2 \cdot g12(x, y))^2}}{N^2}$$ [Math. 6]

The corner point detection unit 108 performs corner point detection processing. In a case where the degree of corner of a center point becomes a local maximum in an area of 3 pixels×3 pixels, the corresponding center point is a corner point. Using the previously obtained degree of corner C(x,y) as an input, with respect to the position of each point (x,y) in the image, the corner point detection unit 108 examines the inside of the range of 3×3 centered at that position. In a case where the degree of corner of a pixel position of interest becomes a local maximum within the range, the corner point detection unit 108 defines the position (x,y) as a new corner point at the current time, adds the pixel position (x,y) to a new corner point list (new feature point list) NLIST, and increments the number NN of new corner points by "1".

FIG. 7 is a diagram illustrating an example of the new corner point list NLIST. The new corner point list NLIST stores therein a number for identifying a corner point and the x coordinate and y coordinate of the corresponding corner point while associating the number for identifying a corner point and the x coordinate and y coordinate of the corresponding corner point with each other. NN is the number of corner points stored in the new corner point list NLIST.

The matching processing unit 114 performs matching processing for a feature point. It is assumed that a video picture which is stored in the video picture DB 104 and precedes by one period of time is I1(x,y) and a video picture at the current time is I2(x,y). I1 and I2 are, for example, the brightness of the video pictures. In addition, it is assumed that the distribution of the degree of corner for the video picture at the current time obtained in the degree-of-corner calculation unit 106 is C(x,y) and a tracking feature point list prior to time preceding by one period of time, stored in the feature point DB 112, is FLIST. In addition, with the number NF of feature points, FLIST defines FGET(FLIST,i) as an operation for extracting an i-th tracking feature point within the FLIST list. In addition, FGET(FLIST,i) returns the coordinate values (Pxi,Pyi) on an image of the i-th tracking feature point within the FLIST list. In addition, it is assumed that FSET(FLIST,i,x,y) sets the position of the i-th tracking feature point within the FLIST list to (x,y). Here, FLIST is a list of the same format as the former NLIST.

Figure 8:
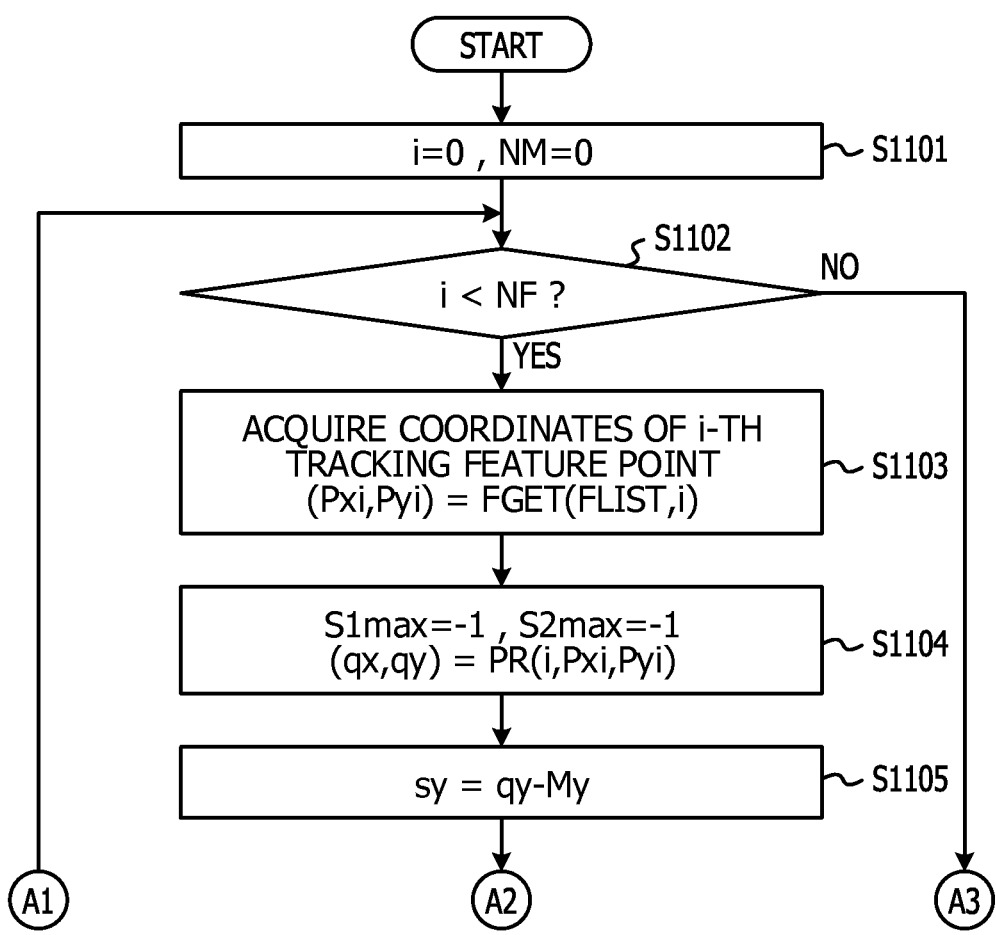
FIG. 8 is a diagram illustrating an example (1) of an operation flow of matching processing in a matching processing unit 114.
Figure 9:
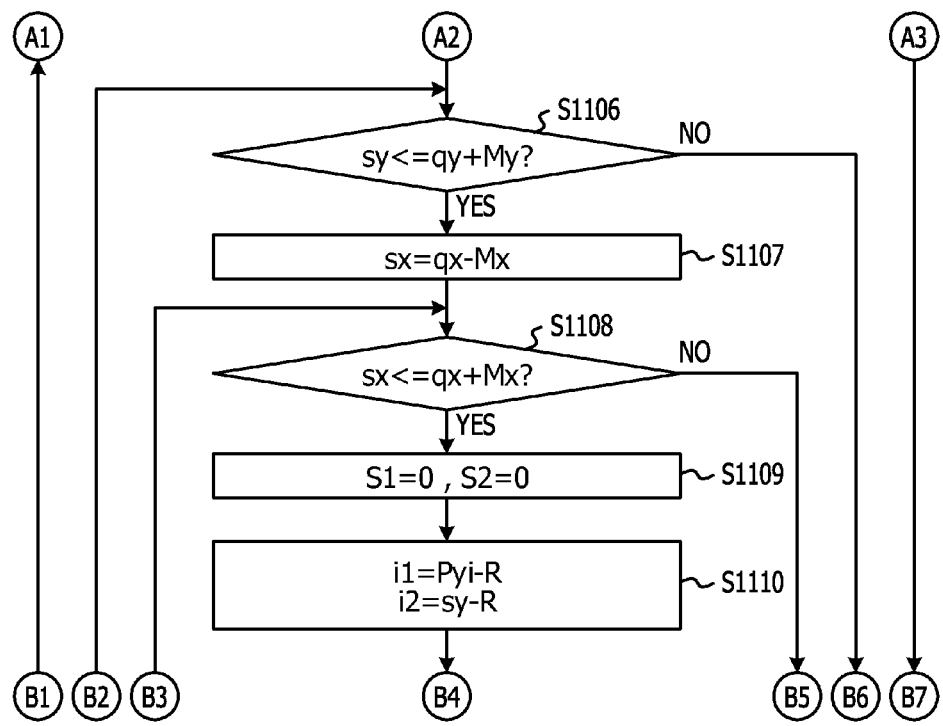
FIG. 9 is a diagram illustrating an example (2) of an operation flow of the matching processing in the matching processing unit 114.
Figure 10:
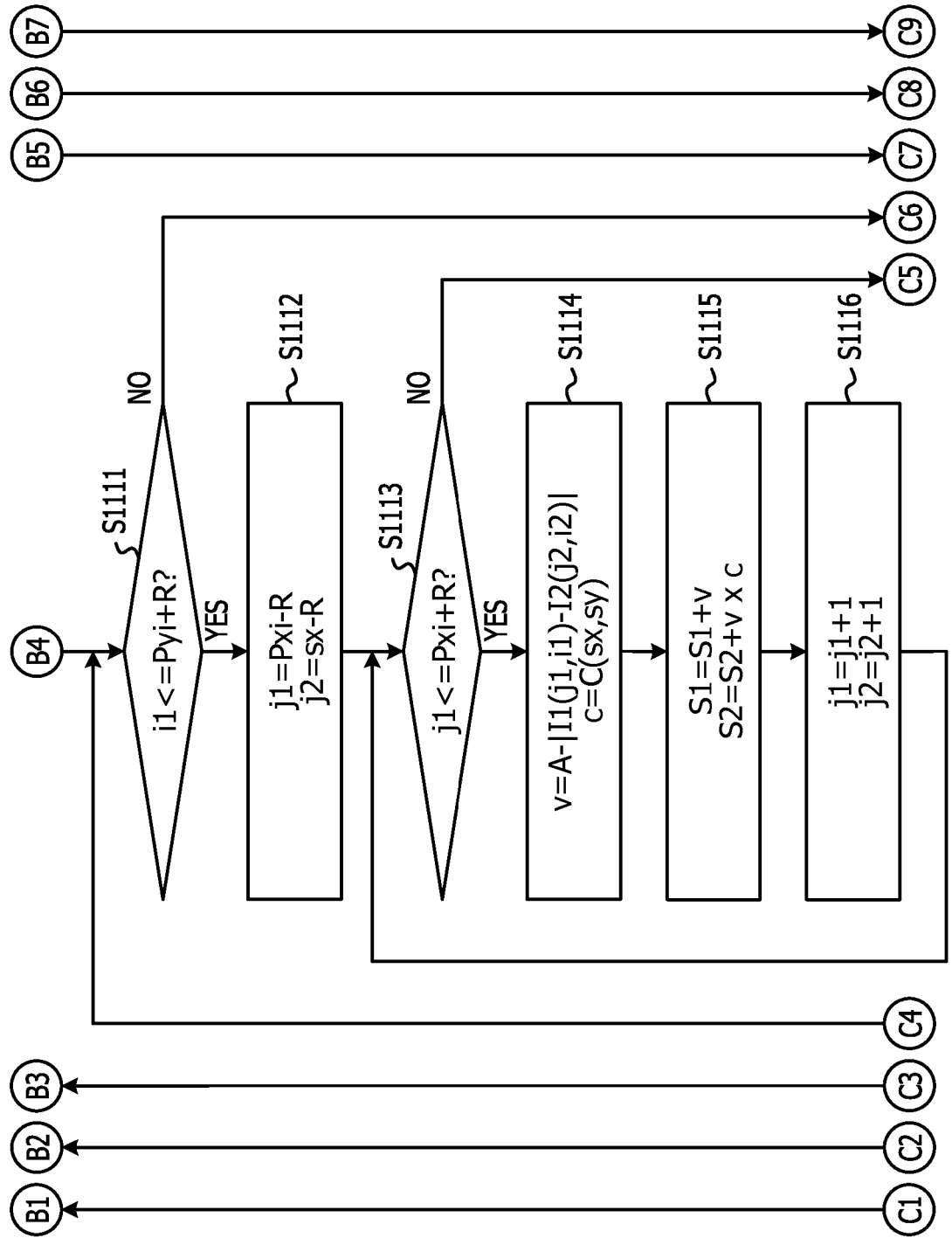
FIG. 10 is a diagram illustrating an example (3) of an operation flow of the matching processing in the matching processing unit 114.
Figure 11:
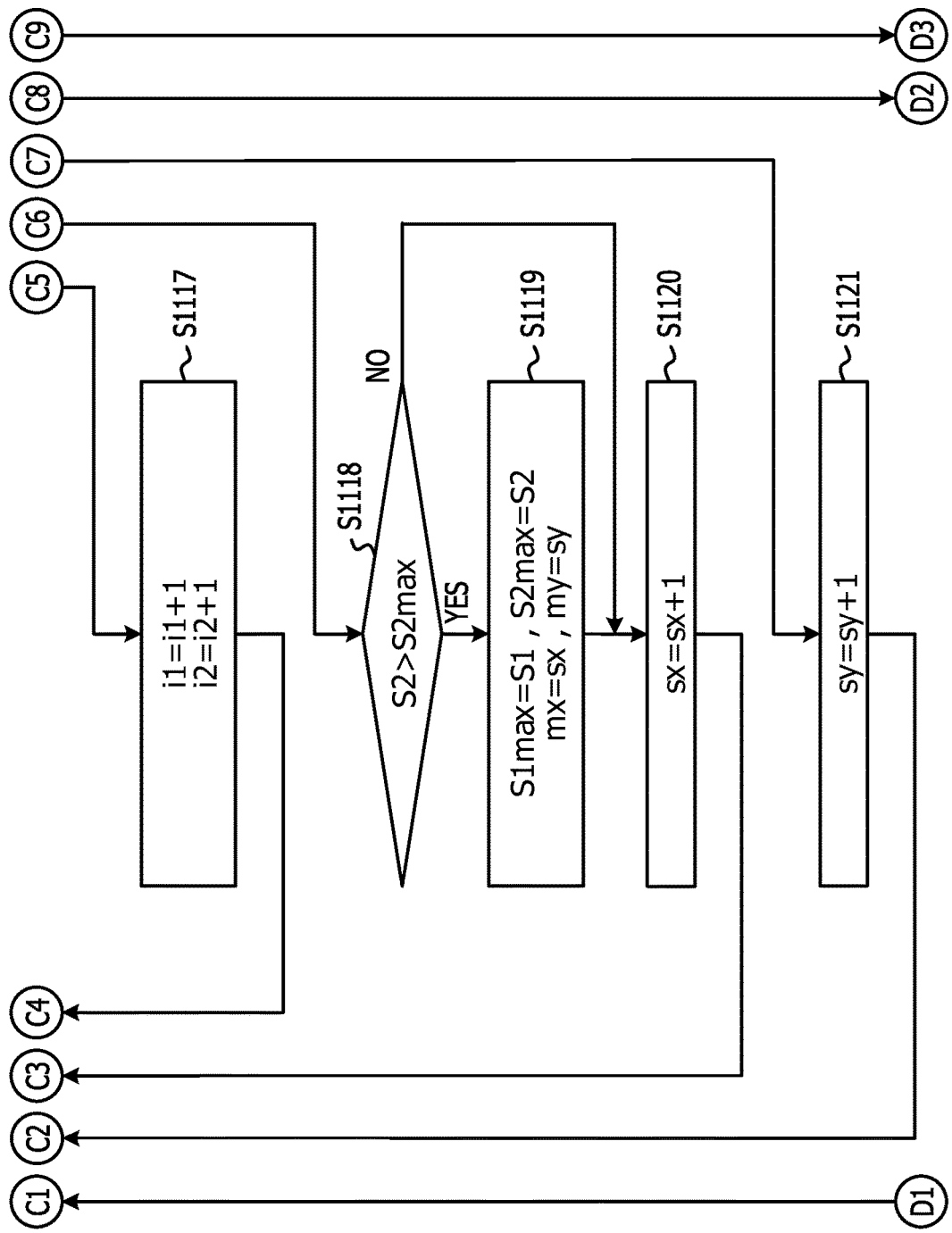
FIG. 11 is a diagram illustrating an example (4) of an operation flow of the matching processing in the matching processing unit 114.
Figure 12:
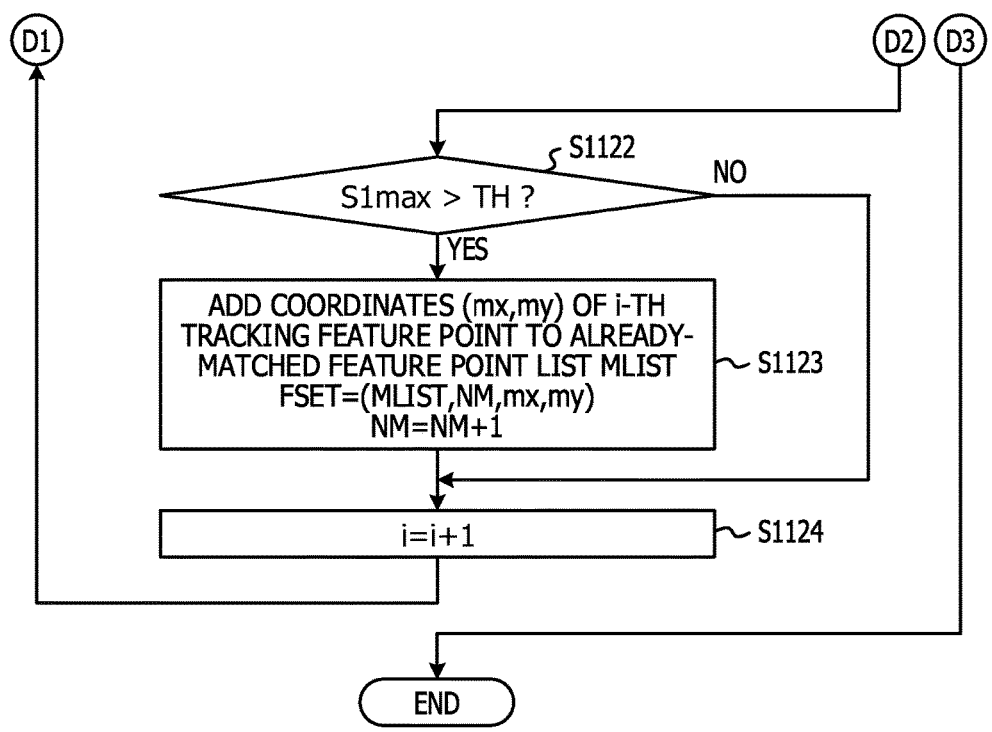
FIG. 12 is a diagram illustrating an example (5) of an operation flow of the matching processing in the matching processing unit 114.

FIG. 8, FIG. 9, FIG. 10, FIG. 11, and FIG. 12 are diagram illustrating examples of the operation flows of matching processing in the matching processing unit 114. "A1", "A2", and "A3" in FIG. 8 are connected to "A1", "A2", and "A3" in FIG. 9, respectively. "B1", "B2", "B3", "B4", "B5", "B6", and "B7" in FIG. 9 are connected to "B1", "B2", "B3", "B4", "B5", "B6", and "B7" in FIG. 10, respectively. "C1", "C2", "C3", "C4", "C5", "C6", "C7", "C8", and "C9" in FIG. 10 are connected to "C1", "C2", "C3", "C4", "C5", "C6", "C7", "C8", and "C9" in FIG. 11, respectively. "D1", "D2", an "D3" in FIG. 11 are connected to "D1", "D2", and "D3" in FIG. 12, respectively.

In a step S1101, the matching processing unit 114 assigns 0 to i, and assigns 0 to NM. "i" corresponds to the number of a feature point to be tracked. In a step S1102, the matching processing unit 114 determines whether or not i is less than the number NF of feature points. Here, the matching processing unit 114 confirms whether or not searching is performed for all tracking feature points. In a case where i is greater than or equal to the number NF of feature points (i becomes the number NF of feature points) (S1102: NO), the processing is terminated. In a case where i is less than the number NF of feature points (S1102: YES), the processing proceeds to a step S1103.

In the step S1103, the matching processing unit 114 acquires the coordinates of the i-th tracking feature point from FLIST. FLIST is stored in the feature point DB 112. The matching processing unit 114 defines the acquired coordinates of the tracking feature point as (Pxi,Pyi). The coordinates (Pxi,Pyi) of the i-th tracking feature point, acquired here, are coordinates preceding by one period of time.

In a step S1104, the matching processing unit 114 assigns −1 to S1max and assigns −1 to S2max. In addition, it is assumed that the predicted position (qx,qy) of the i-th feature point (tracking feature point) at the current time is given as PR(i,Pxi,Pyi). The matching processing unit 114 calculates PR(i,Pxi,Pyi). PR indicates a process for position prediction. In a case where it is assumed that, for example, the position of a tracking feature point preceding by two periods of time is (rx2,ry2) and the position of a tracking feature point preceding by one period of time is (rx1,ry1), the predicted position (qx,qy) is given as qx=rx1+(rx1−rx2) and qy=ry1+(ry1−ry2) or the like, as linearly predicted values. In a case of using no position prediction, it is desirable that qx=Pxi and qy=Pyi are adopted.

In a step S1105, the matching processing unit 114 assigns qy−My to sy. Coordinates (sx,sy) indicate coordinates (a scanning position) currently searched. While centering around the predicted position (qx,qy), the matching processing unit 114 performs searching within the image I2 at the current time with fluctuation ranges of Mx and My in horizontal and vertical directions, respectively. A search range corresponds to a horizontal range, 2Mx, and a vertical range, 2My, centered at the predicted position (qx,qy).

At the time of searching, while searching within the former search range, the matching processing unit 114 provides a small area of a width, 2R, and a height, 2R, used for video picture comparison and centered at the search (scanning) position (sx,sy) within the search range. The matching processing unit 114 provides a small area whose size is the same as the corresponding small area and which is centered at the tracking feature point position (Pxi,Pyi) of the image I1 at time preceding by one period of time. At each scanning position within the search range, the matching processing unit 114 calculates the degree S1 of video picture coincidence (=a fixed number−an SAD (Sum of absolute difference) value) within the small area. The SAD value indicates the sum of absolute values of brightness differences at individual positions within the small area. By subtracting the SAD value from the fixed number, the degree S1 of video picture coincidence is adjusted so as to have a value that increases with an increase in the degree of coincidence. The degree S1 of video picture coincidence is not limited to this, and may be, for example, the inverse of the SAD value. Furthermore, the matching processing unit 114 calculates a sum S2 (the degree of overall coincidence) obtained by multiplying brightness differences at individual positions within the small area by the degree of corner at the center position of the small area. In addition, in a case where S1 is greater than or equal to a threshold value TH at each scanning position, coincidence is sufficient and reliability is high as matching. Therefore, the matching processing unit 114 calculates a position (mx,my) where the degree S2 of overall coincidence becomes a maximum within the search range, and adds the position (mx,my) to an already-matched feature point list MLIST. On the other hand, in a case where the degree S1 of overall coincidence is less than the threshold value TH, coincidence is low and reliability is low as a feature point. Therefore, the matching processing unit 114 regards the i-th feature point as a tracking failure, and does not add the i-th feature point to the already-matched feature point list MLIST.

In the calculation of the degree S2 of overall coincidence, at the time of obtaining the degree of coincidence at each position within the small area, the matching processing unit 114 obtains the degree v of coincidence of brightness and the likelihood c of being a corner. The degree v of coincidence of brightness and the likelihood c of being a corner are obtained as follows.

$$v = A - |I1(j1,i1) - I2(j2,i2)|$$

$$c = C(sx,sy) \qquad \text{[Math. 7]}$$

Here, (j1,i1) indicates a position within the small area in a case where the small area is provided with being centered at the tracking feature point (Pxi,Pyi) preceding by one period of time. (j2,i2) indicates a position within the same small area in search scanning at the current time. (sx,sy) indicates the center position of the search scanning at the current time. In addition, A is a predetermined fixed positive number. I1(x,y) is the brightness value of coordinates (x,y) in the image I1 preceding by one period of time. I2(x,y) is the brightness value of coordinates (x,y) in the image I2 at the current time.

Specifically, the matching processing unit 114 performs processing as follows.

In a step S1106, the matching processing unit 114 determines whether or not sy is less than or equal to qy+My. In a case where sy exceeds qy+My, the coordinates (sx,sy) are located outside the search range. In a case where sy exceeds qy+My (S1106: NO), the processing proceeds to a step S1122. In a case where sy is less than or equal to qy+My (S1106: YES), the processing proceeds to a step S1107. In the step S1107, the matching processing unit 114 assigns qx−Mx to sx.

In a step S1108, the matching processing unit 114 determines whether or not sx is less than or equal to qx+Mx. In a case where sx exceeds qx+Mx, the coordinates (sx,sy) are located outside the search range. In a case where sx exceeds qx+Mx (S1108: NO), the processing proceeds to a step S1121. In a case where sx is less than or equal to qx+Mx (S1108: YES), the processing proceeds to a step S1109.

In the step S1109, the matching processing unit 114 assigns 0 to S1, and assigns 0 to S2. In a step S1110, the matching processing unit 114 assigns Pyi−R to i1, and assigns sy−R to i2. In a step S1111, the matching processing unit 114 determines whether or not i1 is less than or equal to Pyi+R. In a case where i1 is greater than Pyi+R (S1111: NO), the processing proceeds to a step S1118. In a case where i1 is less than or equal to Pyi+R (S1111: YES), the processing proceeds to a step S1112.

In the step S1112, the matching processing unit 114 assigns Pxi−R to j1, and assigns SX−R to j2.

In a step S1113, the matching processing unit 114 determines whether or not j1 is less than or equal to Pxi+R. In a case where j1 is greater than Pxi+R (S1113: NO), the processing proceeds to a step S1117. In a case where j1 is less than or equal to Pxi+R (S1113: YES), the processing proceeds to a step S1114.

In the step S1114, the matching processing unit 114 assigns A−|I1(j1,i1)−I2(j2,i2)| to v, and assigns C(sx,sy) to c. "v" is the degree of coincidence of brightness. The degree of coincidence of brightness increases with an increase in v. "c" is the likelihood of being a corner.

In a step S1115, the matching processing unit 114 assigns S1+v to S1, and assigns S2+v×c to S2. In a step S1116, the matching processing unit 114 assigns j1+1 to j1, and assigns j2+1 to j2, and the processing returns to the step S1113.

In the step S1117, the matching processing unit 114 assigns i1+1 to i1, and assigns i2+1 to i2, and the processing returns to the step S1111.

In the step S1118, the matching processing unit 114 determines whether or not S2 exceeds S2max. In a case where S2 does not exceed S2max (S1118: NO), the processing proceeds to a step S1120. In a case where S2 exceeds S2max (S1118: YES), the processing proceeds to a step S1119.

In the step S1119, the matching processing unit 114 assigns S1 to S1max, and assigns S2 to S2max. In addition, the matching processing unit 114 assigns sx to mx, and assigns sy to my.

In the step S1120, the matching processing unit 114 assigns sx+1 to sx, and the processing returns to the step S1108.

In the step S1121, the matching processing unit 114 assigns sy+1 to sy, and the processing returns to the step S1106.

In the step S1122, the matching processing unit 114 determines whether or not S1max exceeds the predetermined threshold value TH. In a case where S1max does not exceed the predetermined threshold value (S1122: NO), the processing proceeds to a step S1124. In this case, the i-th feature point is regarded as a tracking failure, and is not added to the already-matched feature point list MLIST. In a case where S1max exceeds the predetermined threshold value (S1122: YES), the processing proceeds to a step S1123.

In the step S1123, the matching processing unit 114 adds the coordinates (mx,my) of the i-th tracking feature point to the already-matched feature point list MLIST. NM is a new number assigned to the corresponding feature point. The matching processing unit 114 assigns NM+1 to NM, and the processing proceeds to the step S1124.

In the step S1124, the matching processing unit 114 assigns i+1 to i, and the processing returns to the step S1102.

Figure 13A:
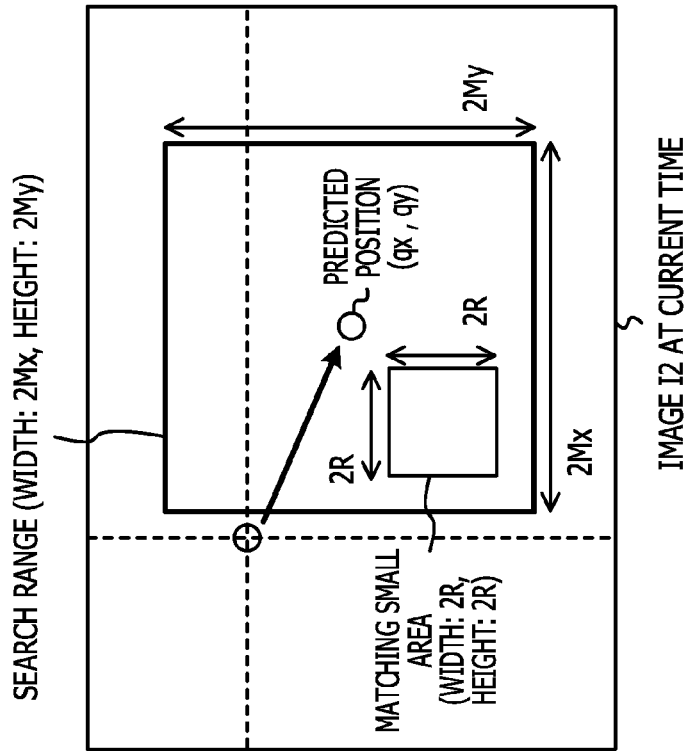
FIGS. 13A and 13B are diagrams illustrating an image I1 preceding by one period of time and an image I2 at current time.
Figure 13B:
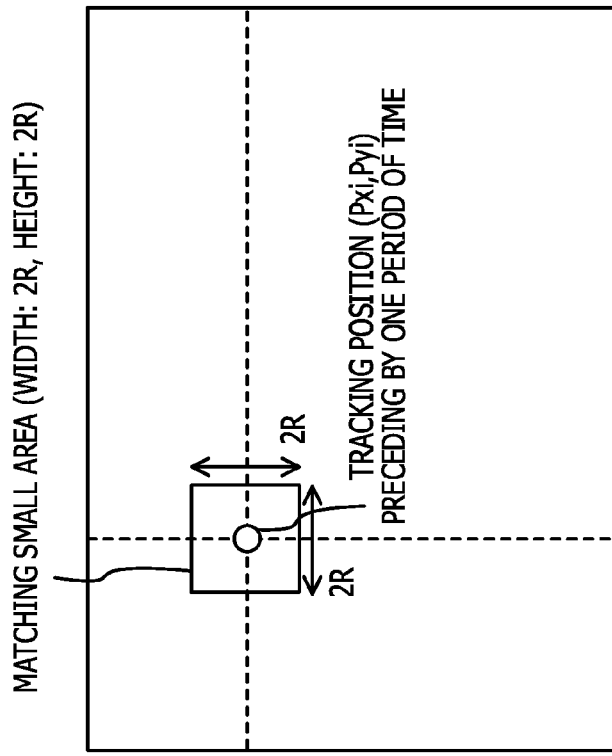

FIGS. 13A and 13B are diagrams illustrating the image I1 preceding by one period of time and the image I2 at the current time. The image I1 preceding by one period of time in FIG. 13A has a matching small area of a width, 2R, and a height, 2R, centered at the tracking feature point (Pxi,Pyi) preceding by one period of time. The image I2 at the current time in FIG. 13B has a search range of a width, 2Mx, and a height, 2My, centered at the predicted position (qx,qy). In addition, the image I2 at the current time in FIG. 13B has a matching small area of a width, 2R, and a height, 2R, which includes a portion of the search range.

Using, as inputs, the already-matched feature point list MLIST (the number NM of feature points) in a time series and the new feature point list NLIST (the number NN of feature points) at the current time, the feature point addition and deletion unit 110 performs addition and deletion of feature points.

Figure 14:
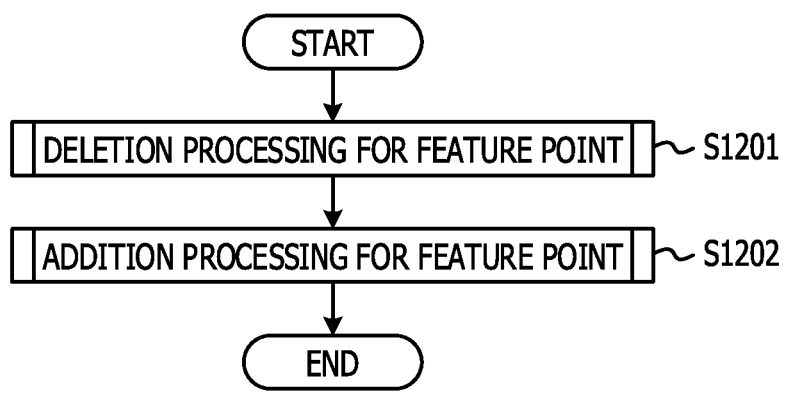
FIG. 14 is a diagram illustrating an example of an operation flow of a feature point addition and deletion unit.

FIG. 14 is a diagram illustrating an example of the operation flow of a feature point addition and deletion unit. The feature point addition and deletion unit 110 performs deletion processing for a feature point (S1201), and performs addition processing for a feature point (S1202).

Next, the deletion processing for a feature point in the feature point addition and deletion unit 110 will be described.

Figure 15:
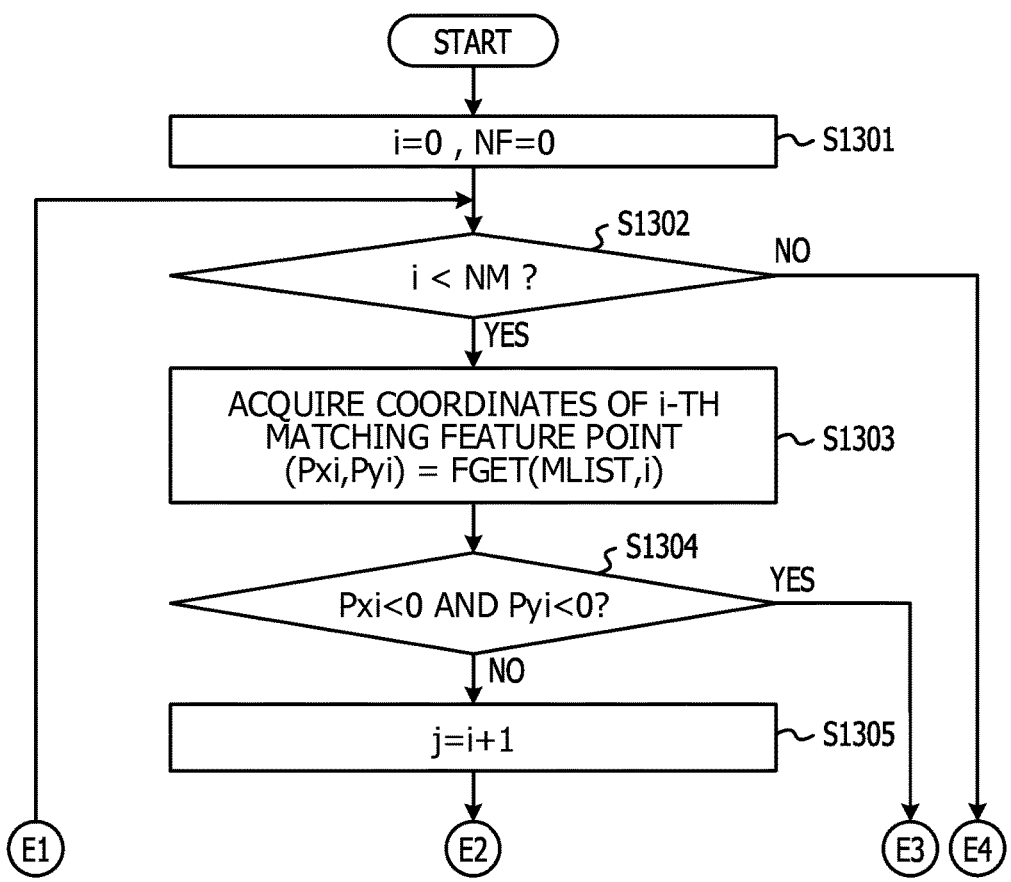
FIG. 15 is a diagram illustrating an example (1) of an operation flow of deletion processing for a feature point in the feature point addition and deletion unit.
Figure 16:
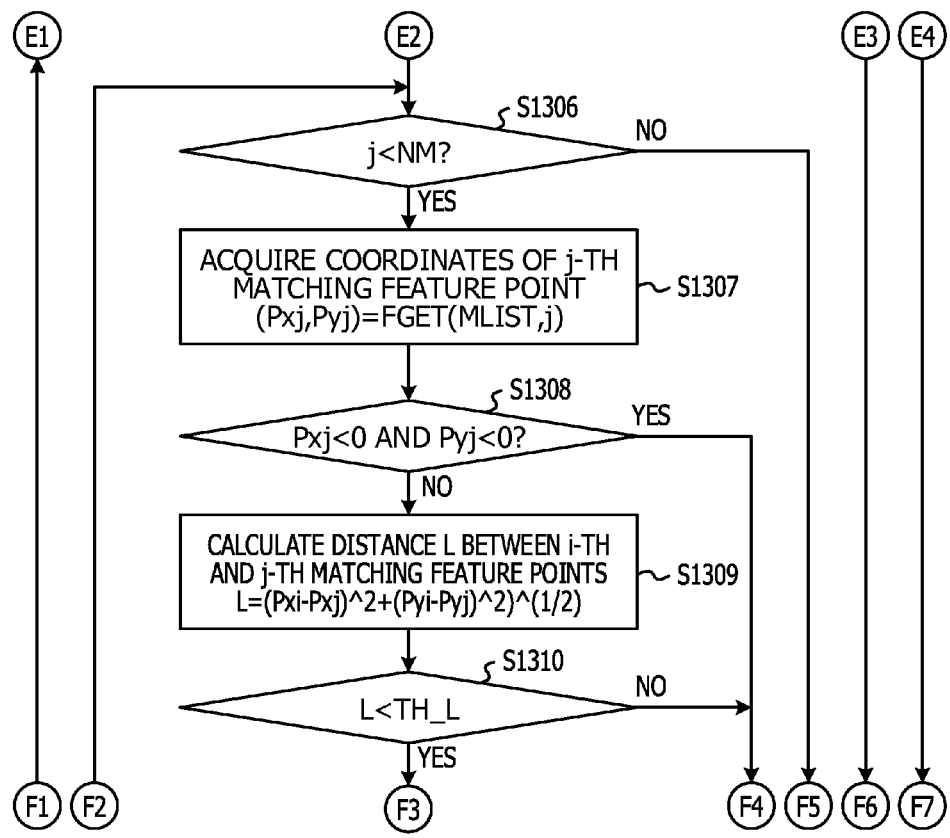
FIG. 16 is a diagram illustrating an example (2) of an operation flow of the deletion processing for the feature point in the feature point addition and deletion unit.
Figure 17:
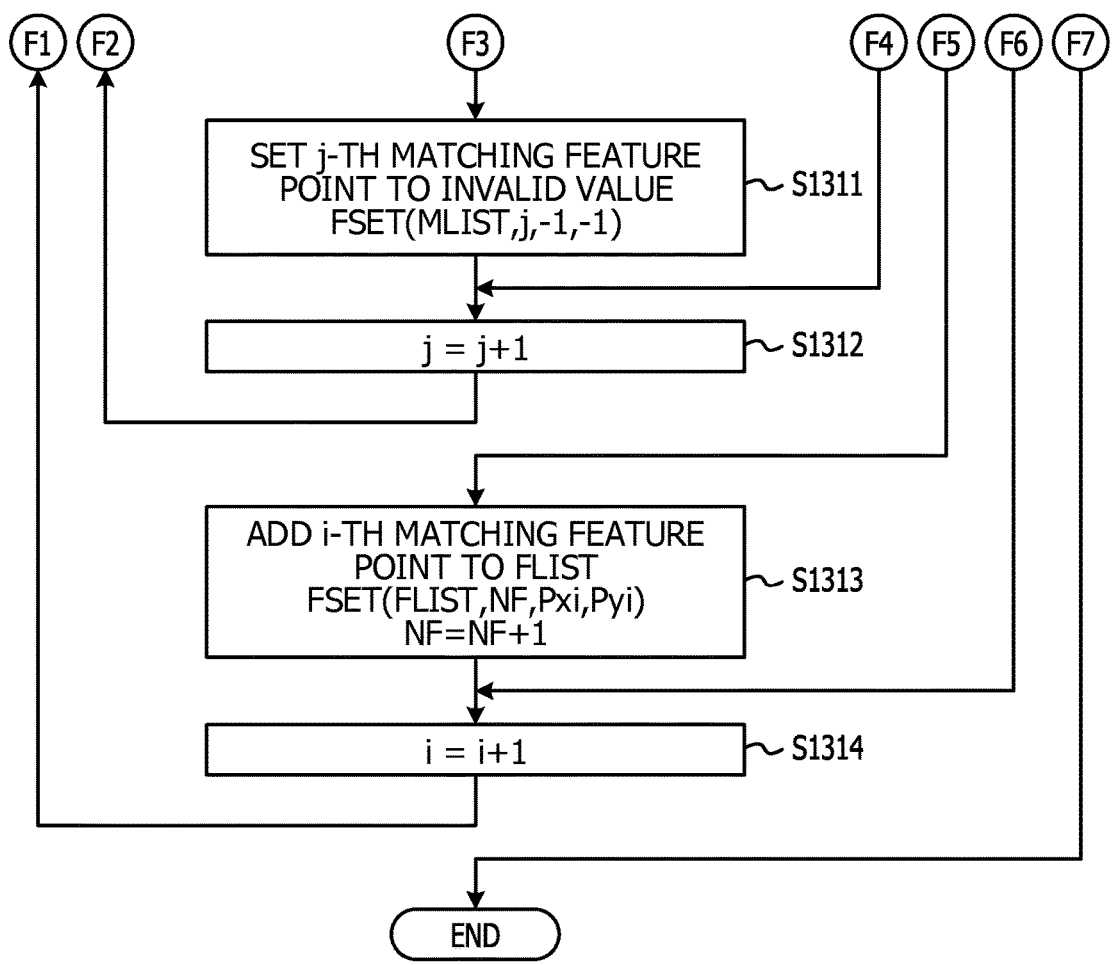
FIG. 17 is a diagram illustrating an example (3) of an operation flow of the deletion processing for the feature point in the feature point addition and deletion unit.

FIG. 15, FIG. 16, and FIG. 17 are diagrams illustrating examples of the operation flows of deletion processing for a feature point in the feature point addition and deletion unit. "E1", "E2", "E3", and "E4" in FIG. 15 are connected to "E1", "E2", "E3", and "E4" in FIG. 16, respectively. "F1", "F2", "F3", "F4", "F5", "F6", and "F7" in FIG. 16 are connected to "F1", "F2", "F3", "F4", "F5", "F6", and "F7" in FIG. 17, respectively.

In a step S1301, the feature point addition and deletion unit 110 assigns 0 to i, and assigns 0 to NF.

In a step S1302, the feature point addition and deletion unit 110 determines whether or not i is less than NM. In a case where i is greater than or equal to NM (S1302: NO), the processing is terminated. In a case where i is less than NM (S1302: YES), the processing proceeds to a step S1303.

In the step S1303, the feature point addition and deletion unit 110 acquires an i-th matching feature point from MLIST in the feature point DB 112, and defines the coordinates of the i-th matching feature point as (Pxi,Pyi).

In a step S1304, the feature point addition and deletion unit 110 determines whether or not Pxi is less than 0 and Pyi is less than 0. In a case where Pxi is less than 0 and Pyi is less than 0 (S1304: YES), the processing proceeds to a step S1314. In a case where Pxi is greater than or equal to 0 or Pyi is greater than or equal to 0 (S1304: NO), the processing proceeds to a step S1305. That Pxi is less than 0 and Pyi is less than 0 indicates that a feature point indicated by the corresponding coordinates is an invalid point.

In the step S1305, the feature point addition and deletion unit 110 assigns i+1 to j.

In a step S1306, the feature point addition and deletion unit 110 determines whether or not j is less than NM. In a case where j is not less than NM (S1306: NO), the processing proceeds to a step S1313. In a case where j is less than NM (S1306: YES), the processing proceeds to a step S1307.

In the step S1307, the feature point addition and deletion unit 110 acquires the coordinates of a j-th matching feature point from MLIST in the feature point DB 112, and defines the coordinates of the j-th matching feature point as (Pxj,Pyj).

In a step S1308, the feature point addition and deletion unit 110 determines whether or not Pxj is less than 0 and Pyj is less than 0. In a case where Pxj is less than 0 and Pyj is less than 0 (S1308: YES), the processing proceeds to a step S1312. In a case where Pxj is greater than or equal to 0 or Pyj is greater than or equal to 0 (S1308: NO), the processing proceeds to a step S1309. That Pxj is less than 0 and Pyj is less than 0 indicates that a feature point indicated by the corresponding coordinates is an invalid point.

In the step S1309, the feature point addition and deletion unit 110 calculates a distance L between the i-th matching feature point and the j-th matching feature point. The distance L is obtained as follows.

$$L=\sqrt{(Pxi-Pxj)^2+(Pyi-Pyj)^2} \quad \text{[Math. 8]}$$

In a step S1310, the feature point addition and deletion unit 110 determines whether or not the distance L obtained in the step S1309 is less than a predetermined threshold value TH_L. In a case where the distance L is greater than or equal to the threshold value TH_L (S1310: NO), the processing proceeds to the step S1312. In a case where distance L is less than the threshold value TH_L (S1310: YES), the processing proceeds to a step S1311.

In the step S1311, the feature point addition and deletion unit 110 sets the j-th matching feature point to an invalid value. Specifically, the feature point addition and deletion unit 110 sets the coordinates of an j-th point in MLIST to (−1,−1) serving as an invalid value. The corresponding j-th feature point set in such a way becomes an invalid point.

In the step S1312, the feature point addition and deletion unit 110 assigns j+1 to j, and the processing returns to the step S1306.

In the step S1313, the feature point addition and deletion unit 110 adds the i-th matching feature point to FLIST. Specifically, the feature point addition and deletion unit 110 adds the coordinates (Pxi,Pyi) as an NF-th feature point in FLIST. In addition, the feature point addition and deletion unit 110 assigns NF+1 to NF.

In the step S1314, the feature point addition and deletion unit 110 assigns i+1 to i, and the processing returns to the step S1302.

Based on the deletion processing in FIG. 15, FIG. 16, and FIG. 17, from among feature points properly subjected to matching by tracking, the feature point addition and deletion unit 110 finally registers, in the tracking feature point list FLIST, a feature point whose distances from all the other feature points are greater than or equal to the threshold value TH_L (the number NF of feature points).

Next, the addition processing for a feature point in the feature point addition and deletion unit 110 will be described.

Figure 18:
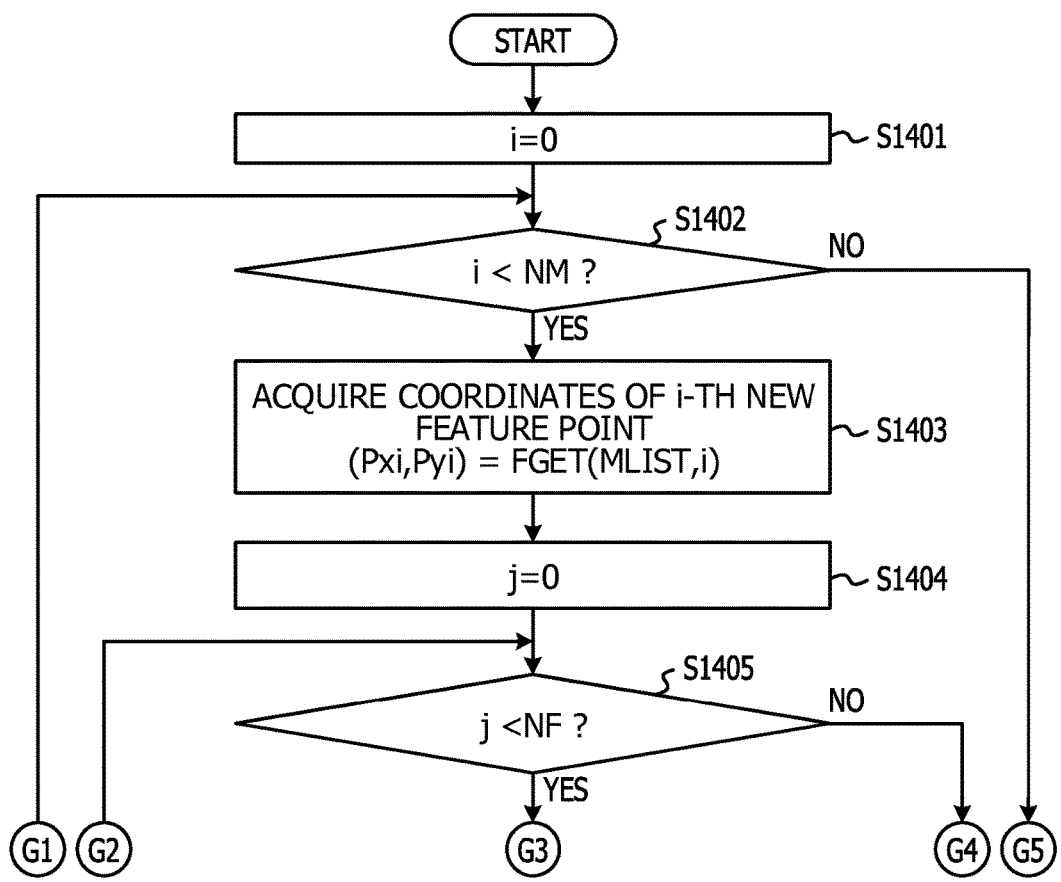
FIG. 18 is a diagram illustrating an example (1) of an operation flow of addition processing for a feature point in the feature point addition and deletion unit.
Figure 19:
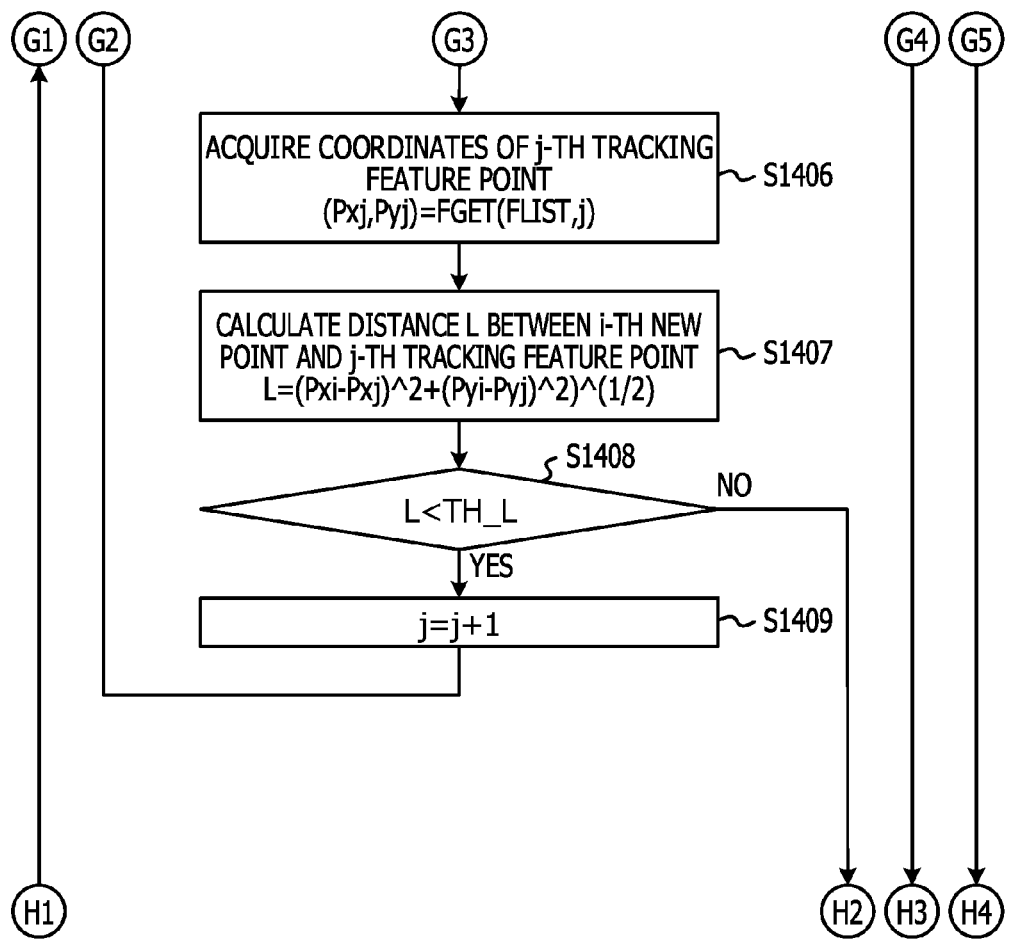
FIG. 19 is a diagram illustrating an example (2) of an operation flow of the addition processing for the feature point in the feature point addition and deletion unit.
Figure 20:
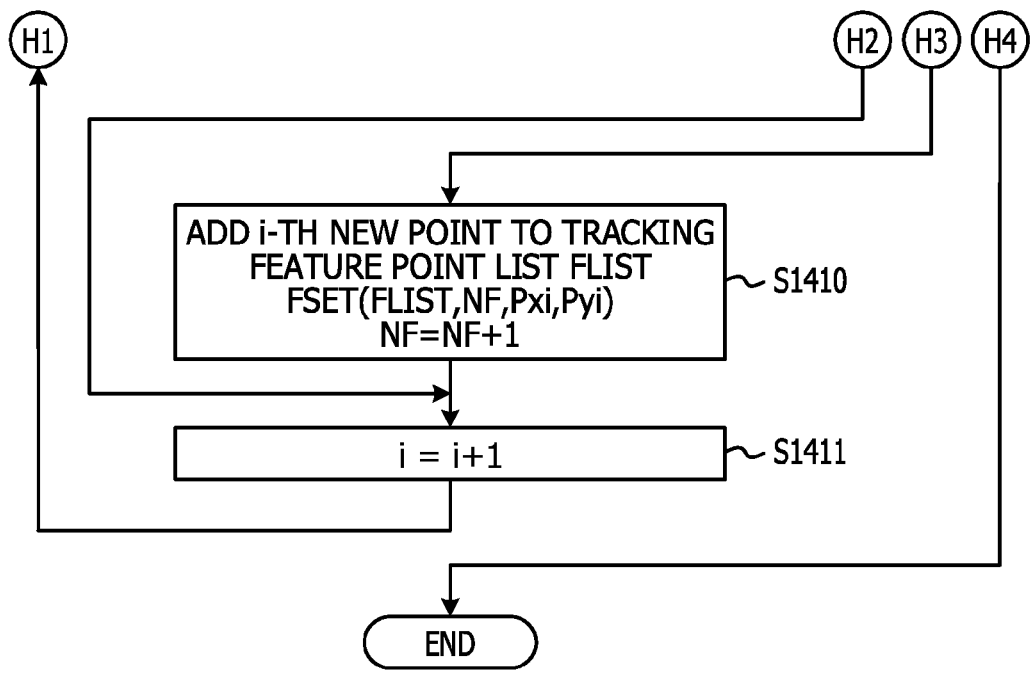
FIG. 20 is a diagram illustrating an example (3) of an operation flow of the addition processing for the feature point in the feature point addition and deletion unit.

FIG. 18, FIG. 19, and FIG. 20 are diagrams illustrating examples of the operation flows of addition processing for a feature point in the feature point addition and deletion unit. "G1", "G2", "G3", "G4", and "G5" in FIG. 18 are connected to "G1", "G2", "G3", "G4", and "G5" in FIG. 19, respectively. "H1", "H2", "H3", and "H4" in FIG. 19 are connected to "H1", "H2", "H3", and "H4" in FIG. 20, respectively.

In a step S1401, the feature point addition and deletion unit 110 assigns 0 to i.

In a step S1402, the feature point addition and deletion unit 110 determines whether or not i is less than NN. In a case where i is greater than or equal to NN (S1402: NO), the processing is terminated. In a case where i is less than NN (S1402: YES), the processing proceeds to a step S1403.

In the step S1403, the feature point addition and deletion unit 110 acquires the coordinates of an i-th new feature point from NLIST, and defines the coordinates of the i-th new feature point as (Pxi,Pyi).

In a step S1404, the feature point addition and deletion unit 110 assigns 0 to j.

In a step S1405, the feature point addition and deletion unit 110 determines whether or not j is less than NF. In a case where j is greater than or equal to NF (S1405: NO), the processing proceeds to a step S1410. In a case where j is less than NF (S1405: YES), the processing proceeds to a step S1406.

In the step S1406, the feature point addition and deletion unit 110 acquires the coordinates of a j-th tracking feature point from FLIST, and defines the coordinates of the j-th tracking feature point as (Pxj,Pyj).

In a step S1407, the feature point addition and deletion unit 110 calculates a distance L between the i-th new point and the j-th tracking feature point. The distance L is obtained as follows.

$$L=\sqrt{(Pxi-Pxj)^2+(Pyi-Pyj)^2}$$ [Math. 9]

In a step S1408, the feature point addition and deletion unit 110 determines whether or not the distance L obtained in the step S1408 is less than the predetermined threshold value TH_L. In a case where the distance L is greater than or equal to the threshold value TH_L (S1408: NO), the processing proceeds to a step S1411. In a case where the distance L is less than the threshold value TH_L (S1408: YES), the processing proceeds to a step S1409.

In the step S1409, the feature point addition and deletion unit 110 assigns j+1 to j, and the processing returns to the step S1405.

In the step S1410, the feature point addition and deletion unit 110 adds the i-th new feature point to the tracking feature point list FLIST. Specifically, the feature point addition and deletion unit 110 registers, as an NF-th feature point, the coordinates (Pxi,Pyi) in FLIST. In addition, the feature point addition and deletion unit 110 assigns NF+1 to NF.

In the step S1411, the feature point addition and deletion unit 110 assigns i+1 to i, and the processing returns to step S1402.

Based on the addition processing in FIG. 18, FIG. 19, and FIG. 20, from among new feature points included in NLIST, the feature point addition and deletion unit 110 registers, in the tracking feature point list FLIST, a new feature point whose distances from all the other feature points (feature points included in NLIST) are greater than or equal to the threshold value TH_L.

Function Effect of Embodiment 1

The feature point tracking device 100 calculates the degree of corner from an image input in a time series, and detects a corner point. Based on the degree of coincidence of an image (brightness) of a small area and the degree of corner of the center point of the small area, the feature point tracking device 100 calculates the degree of overall coincidence, and tracks a feature point. By defining, as a tracking feature point, the center point of the small area where the degree of coincidence of the brightness of the small area is high and the degree of corner of the center point of the small area is high, the feature point tracking device 100 tracks the feature point.

The likelihood c of being a corner is obtained with respect to the center position (sx,sy) of the set small area, using a degree-of-corner distribution C(x,y), and does not utilize the distribution profile of the degree of corner within the small area. The value of the degree of corner at a point is obtained by evaluating the individual vertical and horizontal differential patterns around the corresponding point, and thus is sensitive to a change in the visibility of a target. In a case where a small area is provided at a position in the degree-of-corner distribution, the distribution pattern of the degree of corner within the small area greatly changes owing to the movement of the target. Therefore, in a case where the degree of corner at every point within the small area is reflected, even if the degree of coincidence of brightness is large, the degree of corner becomes small, and the degree S2 of overall coincidence is reduced.

On the other hand, as for the degree of corner, even if the pattern shape of a surrounding degree-of-corner distribution is different, a value at each position is meaningful as an index for qualitatively evaluating the likelihood of being a corner. Therefore, the matching processing unit 114 calculates the degree S2 of overall coincidence using the likelihood of being a corner (=a degree as an original corner feature) at the center position (sx,sy) of interest in scanning within the search range. From this, even if a change in the profile of the surrounding degree-of-corner distribution is large, the feature point tracking device 100 is able to define a point that coincides as a video picture pattern most of all while maintaining a characteristic as a corner, and is able to perform tracking with a suppressed position deviation, in tracking in a time series.

According to the feature point tracking device 100, in a case of extracting a feature point from a video picture image-captured using a camera or the like attached to a moving object and tracking the position of the feature point from time-series video pictures, it is possible to realize more accurate tracking over a long time period by suppressing the deviation of the position of the feature point to be tracked while following a time-series change in the visibility.

Embodiment 2

Next, an embodiment 2 will be described. The embodiment 2 has a point in common with the embodiment 1. Accordingly, a difference will be mainly described, and the description of the common point will be omitted.

Example of Configuration

Figure 21:
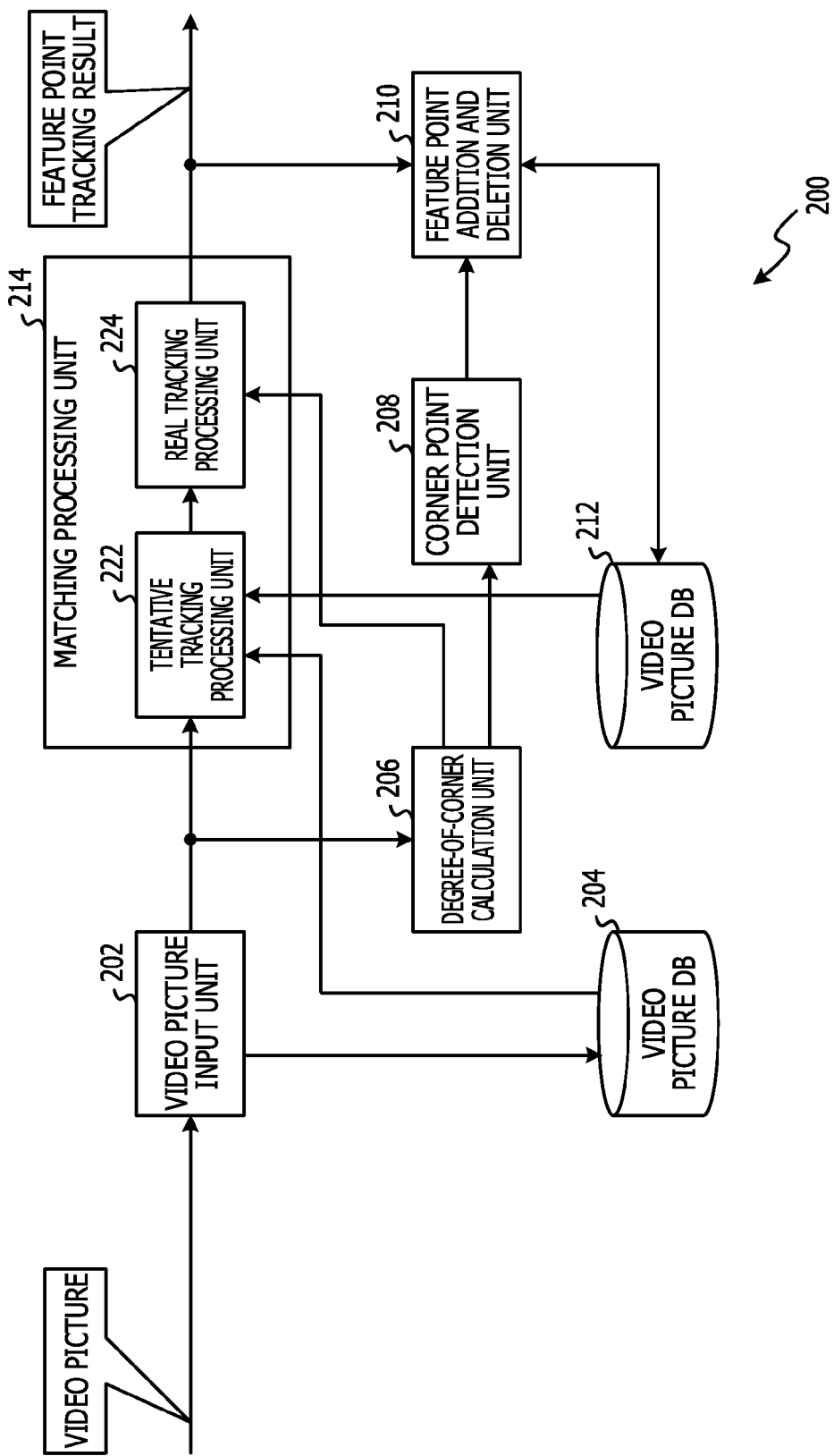
FIG. 21 is a diagram illustrating an example of a configuration of a feature point tracking device of an embodiment 2.

FIG. 21 is a diagram illustrating an example of the configuration of a feature point tracking device of the present embodiment. A feature point tracking device 200 includes a video picture input unit 202, a video picture DB 204, a degree-of-corner calculation unit 206, a corner point detection unit 208, a feature point addition and deletion unit 210, a feature point DB 212, and a matching processing unit 214. The matching processing unit 214 includes a tentative tracking processing unit 222 and a real tracking processing unit 224.

The video picture input unit 202 inputs an external video picture image-captured by a camera, converts the external video picture into desired digital video picture data, and sends the digital video picture data to the degree-of-corner calculation unit 206, the matching processing unit 214, and the video picture DB 204.

The video picture DB 204 holds video picture data at current time, and video picture data preceding by one period of time.

The degree-of-corner calculation unit 206 calculates, from the video picture data, the distribution of the degree of corner indicating the likelihood of being a corner at each position in the video picture, and outputs the distribution of the degree of corner to the corner point detection unit 208 and the matching processing unit 214.

The corner point detection unit 208 extracts a corner point (feature point) using the degree-of-corner distribution as an input.

The feature point addition and deletion unit 210 adds a new feature point from an extracted corner point sequence and time-series tracking points stored in the feature point DB 212, and deletes a point unsuitable for tracking.

The feature point DB 212 stores therein a feature point to be tracked in a time-series manner.

The matching processing unit 214 includes the tentative tracking processing unit 222 and the real tracking processing unit 224. Using a video picture preceding by one period of time and a video picture at a current time, the tentative tracking processing unit 222 calculates a tentative tracking corresponding position. Within a local range centered at the tentative corresponding position obtained in the tentative tracking processing unit 222, the real tracking processing unit 224 determines a first-best coincidence point using the video picture preceding by one period of time, the video picture at the current time, and the degree of corner.

The feature point tracking device 200 outputs, to the outside, a tracking result (the position of a feature point within an image) obtained by tracking the feature point within a video picture in a time-series manner.

Example of Operation

Figure 22:
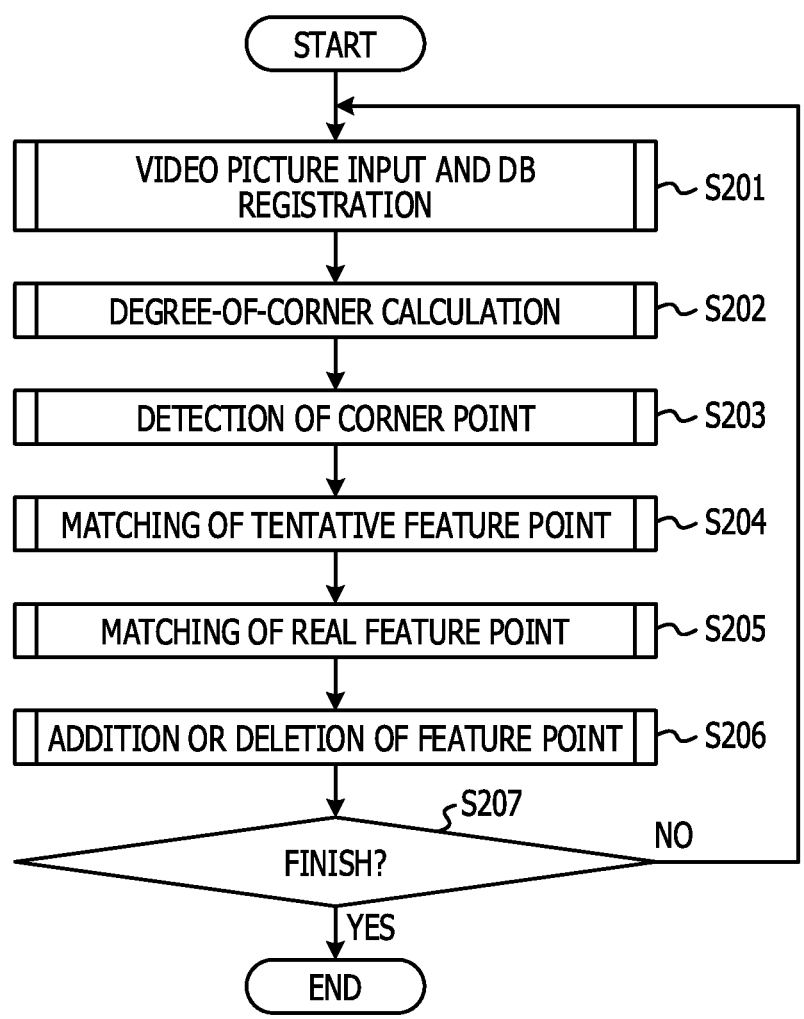
FIG. 22 is a diagram illustrating an example of an operation flow of tracking processing in a time series in a feature point tracking device 200.

FIG. 22 is a diagram illustrating an example of the operation flow of tracking processing in a time series in the feature point tracking device 200.

In a step S201, the video picture input unit 202 in the feature point tracking device 200 acquires a video picture from a camera or the like that image-captures an external world, converts the video picture into a digital video picture, registers a video picture at current time in the video picture DB 204, and outputs the digital video picture to a next-step processing operation.

In a step S202, the degree-of-corner calculation unit 206 calculates, from a digital video picture at the current time, the degree of corner indicating the likelihood of being a corner at each position within the video picture, and generates a degree-of-corner distribution. The generated degree-of-corner distribution is sent to the corner point detection unit 208 and the matching processing unit 214.

In a step S203, using the degree-of-corner distribution, the corner point detection unit 208 identifies a point where the degree of corner locally becomes a local maximum, and sends, as a corner point, the identified point to next-stage processing.

In a step S204, the tentative tracking processing unit 222 in the matching processing unit 214 acquires, as video picture information, an input video picture at the current time and a video picture that is held in the video picture DB 204 and precedes by one period of time, and acquires tracking feature point information that is held in the feature point DB 212 and prior to time preceding by one period of time. Using the acquired information, the tentative tracking processing unit 222 calculates, based on the similarity of the video picture information, a tentative corresponding position at the current time with respect to a tracking feature point preceding by one period of time.

In a step S205, the real tracking processing unit 224 in the matching processing unit 214 performs local searching centered at the tentative corresponding position. From the local searching, the real tracking processing unit 224 calculates a real corresponding position at the current time with respect to the tracking feature point preceding by one period of time, based on an overall similarity to which the degree of corner obtained from the degree-of-corner distribution obtained in the previous stage processing is added, in addition to the similarity of the video picture information. The real tracking processing unit 224 outputs, as a device output, a tracking position (the coordinate values of an image) to the outside of the device, and outputs a tracking result to subsequent stage processing.

The step S203, the step S204, and the step S205 may be executed in parallel, and the step S204 and the step S205 may be executed in advance.

In a step S206, the feature point addition and deletion unit 210 receives a feature point sequence obtained at the current time and obtained in the step S203, and a tracking feature point sequence at the current time, obtained in the step S204 and the step S205. Using, as inputs, the feature point sequence and the tracking feature point sequence, the feature point addition and deletion unit 210 updates the feature point DB 212 by adding a new feature point and deleting a feature point unsuitable for tracking, and prepares for matching processing at subsequent time.

In a step S207, the feature point tracking device 200 determines whether or not inputting of a video picture finishes. In a case where the inputting of a video picture finishes (S207: YES), the processing is terminated. In a case where the inputting of a video picture does not finish (S207: NO), the processing returns to the step S201 and is repeated.

Next, individual processing operations of the operation flow in FIG. 22 will be described in detail.

Video picture input•DB registration processing in the video picture input unit 202 is the same as the video picture input•DB registration processing in the video picture input unit 102 in the embodiment 1. Degree-of-corner calculation processing in the degree-of-corner calculation unit 206 is the same as the degree-of-corner calculation processing in the degree-of-corner calculation unit 106 in the embodiment 1. Corner point detection processing in the corner point detection unit 208 is the same as the corner point detection processing in the corner point detection unit 108 in the embodiment 1.

The matching processing unit 214 performs matching processing for a feature point. It is assumed that a video picture which is stored in the video picture DB 204 and precedes by one period of time is $I1(x,y)$ and a video picture at the current time is $I2(x,y)$. I1 and I2 are, for example, the brightness of the video pictures. In addition, it is assumed that the distribution of the degree of corner for the video picture at the current time obtained in the degree-of-corner calculation unit 206 is C(x,y) and a tracking feature point list prior to time preceding by one period of time, stored in the feature point DB 212, is FLIST. In addition, with the number NF of feature points, FLIST defines FGET(FLIST,i) as an operation for extracting an i-th tracking feature point within FLIST. In addition, FGET(FLIST,i) returns the coordinate values (Pxi,Pyi) on an image of the i-th tracking feature point within FLIST. In addition, it is assumed that FSET (FLIST,i,x,y) sets the position of the i-th tracking feature point within FLIST to (x,y).

Figure 23:
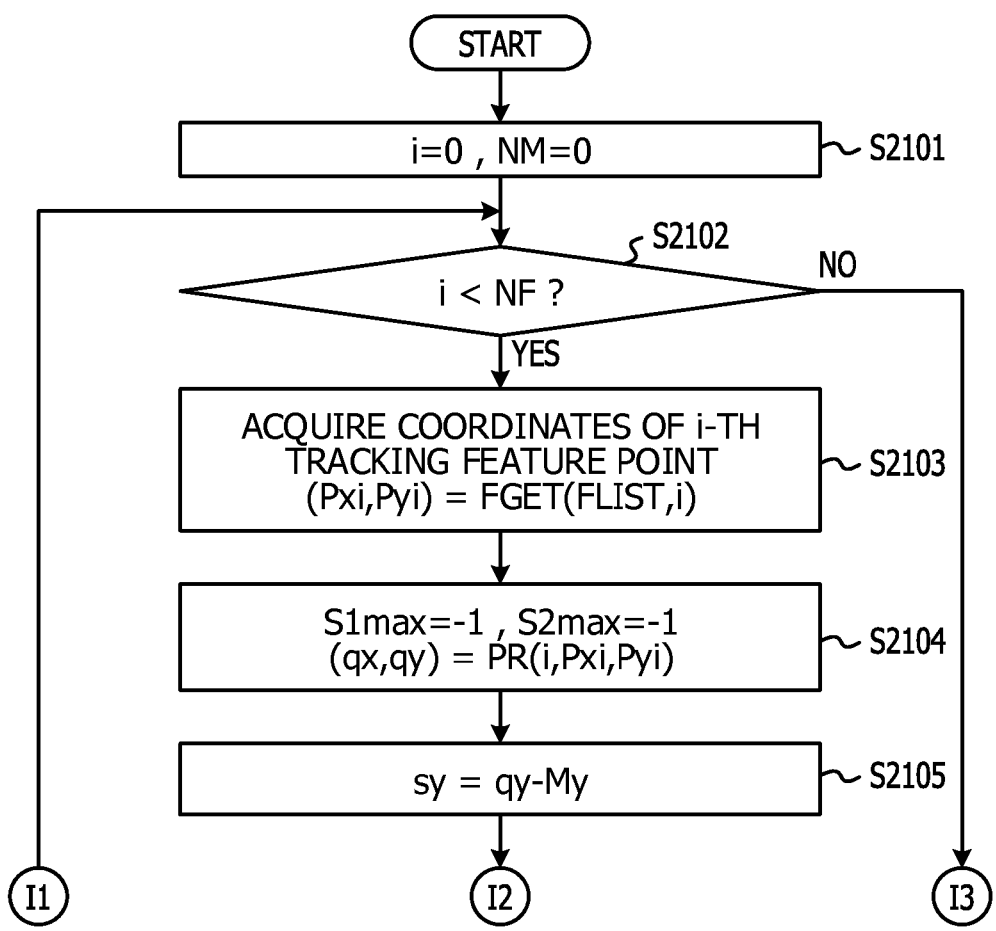
FIG. 23 is a diagram illustrating an example (1) of an operation flow of matching processing in a matching processing unit 214.
Figure 24:
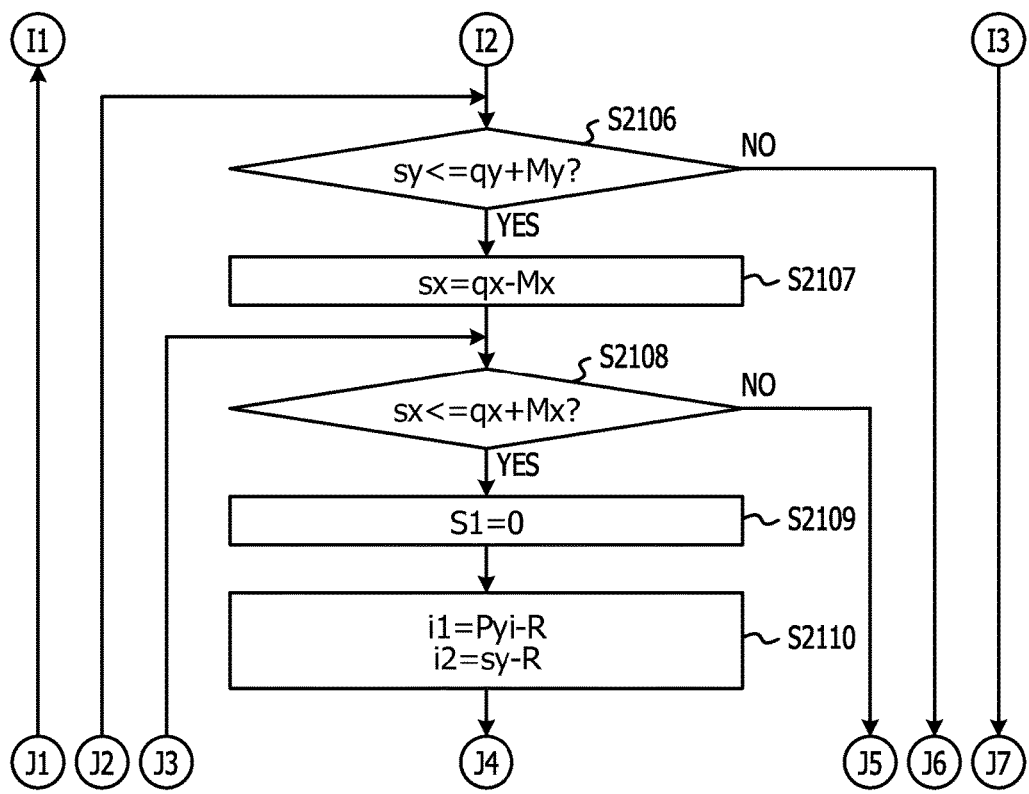
FIG. 24 is a diagram illustrating an example (2) of an operation flow of the matching processing in the matching processing unit 214.
Figure 25:
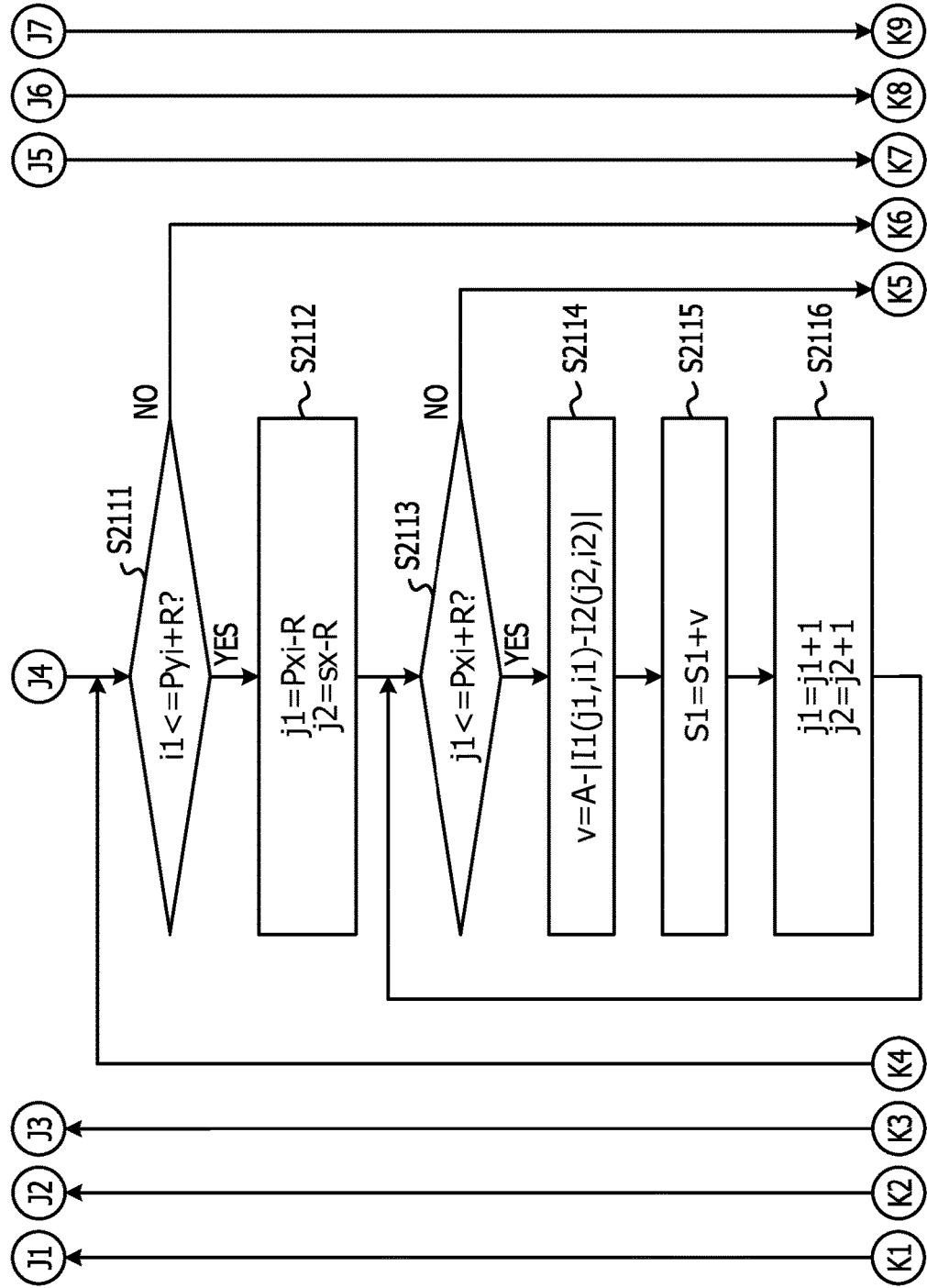
FIG. 25 is a diagram illustrating an example (3) of an operation flow of the matching processing in the matching processing unit 214.
Figure 26:
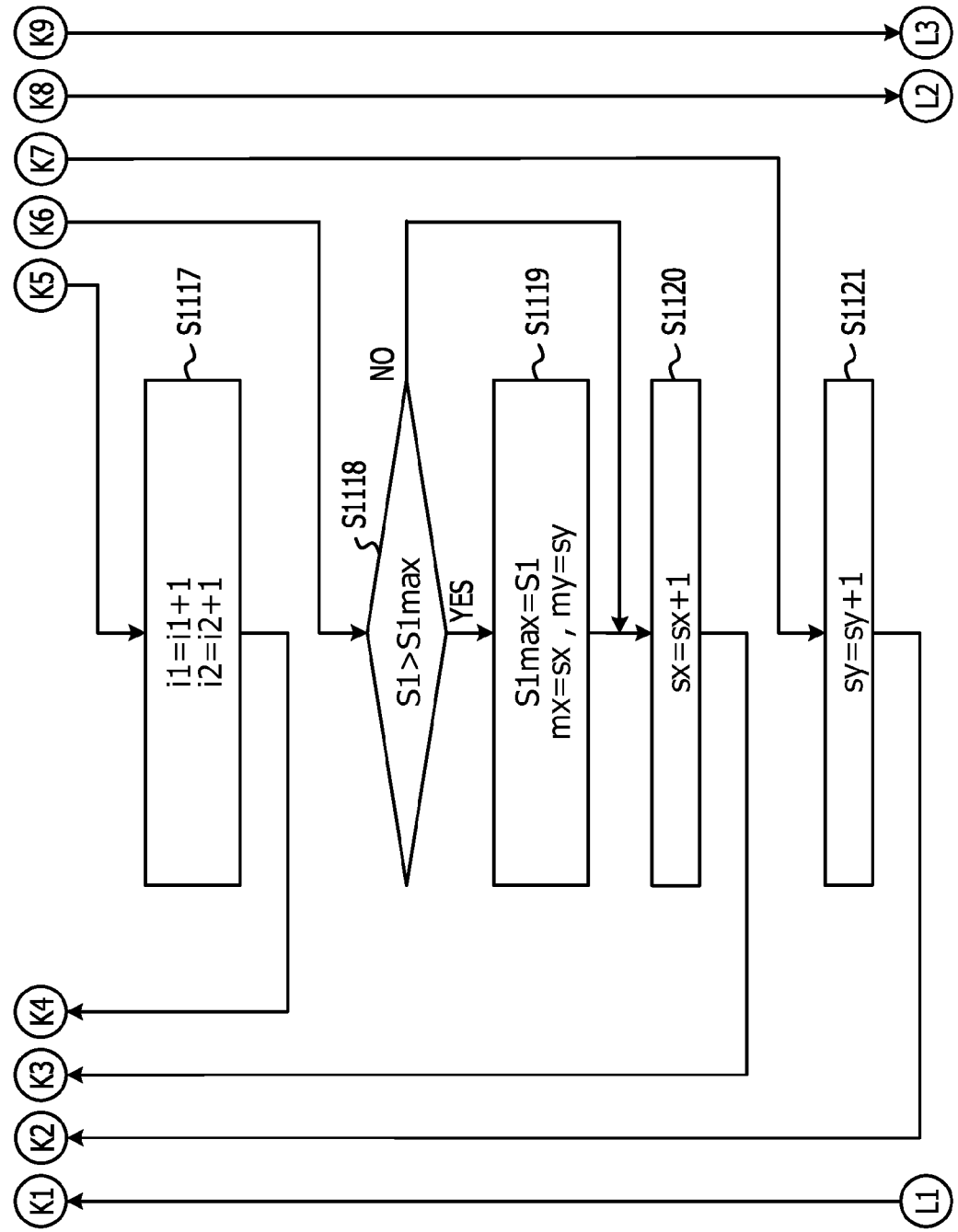
FIG. 26 is a diagram illustrating an example (4) of an operation flow of the matching processing in the matching processing unit 214.
Figure 27:
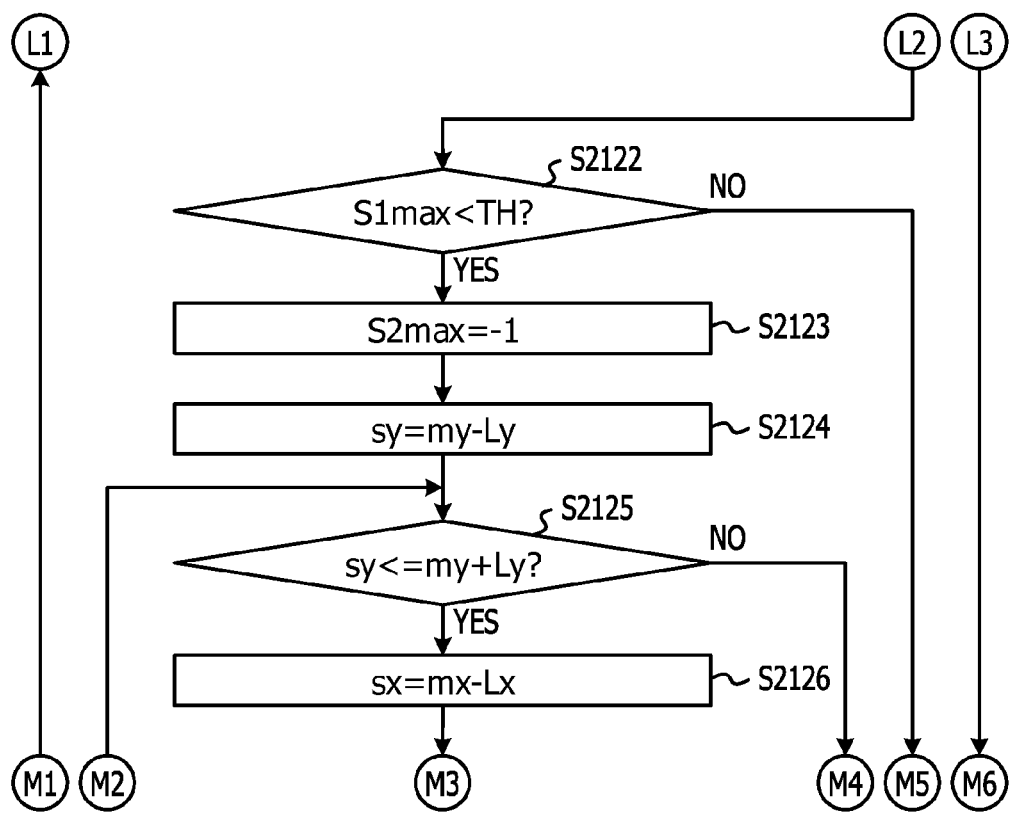
FIG. 27 is a diagram illustrating an example (5) of an operation flow of the matching processing in the matching processing unit 214.
Figure 28:
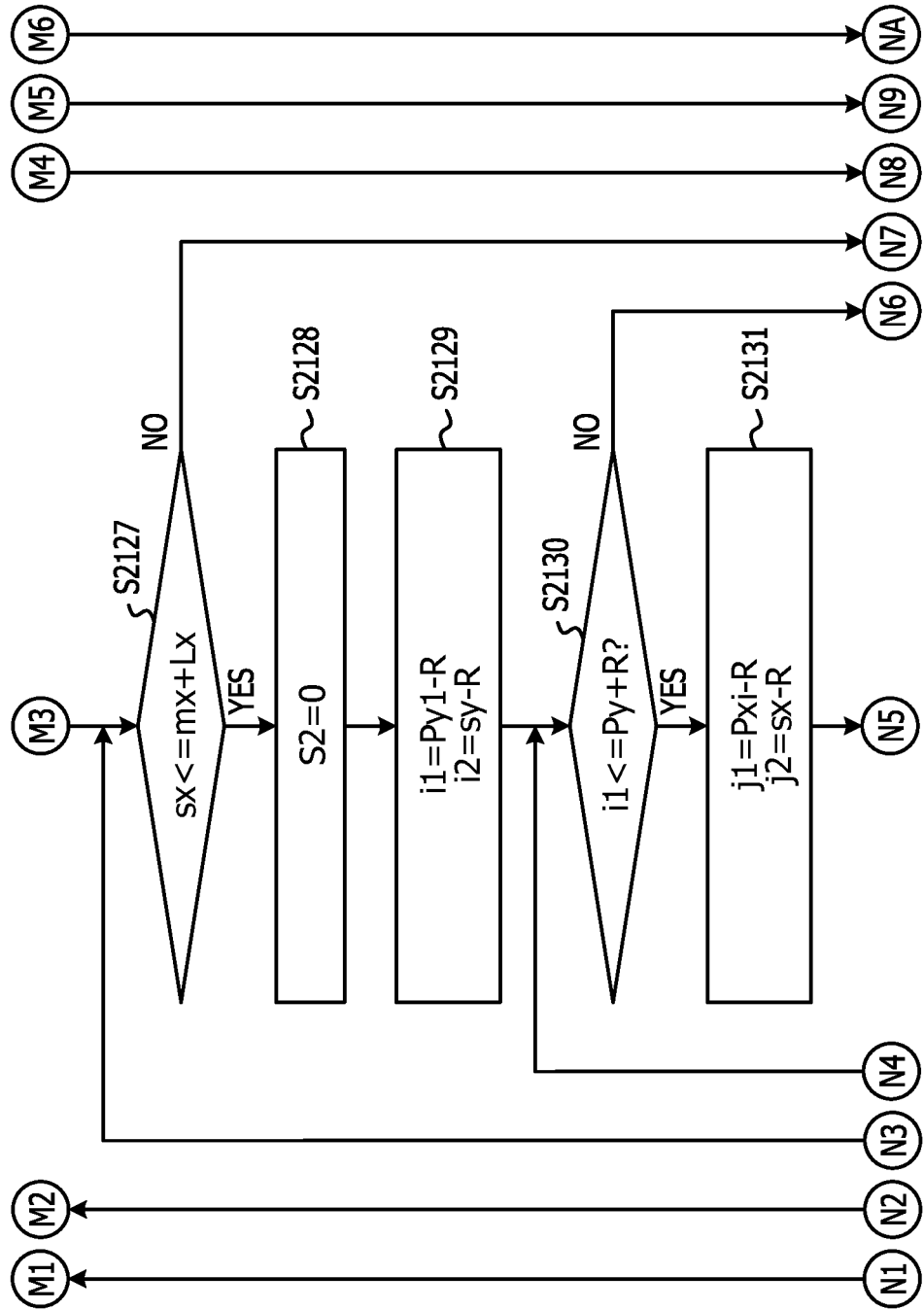
FIG. 28 is a diagram illustrating an example (6) of an operation flow of the matching processing in the matching processing unit 214.
Figure 29:
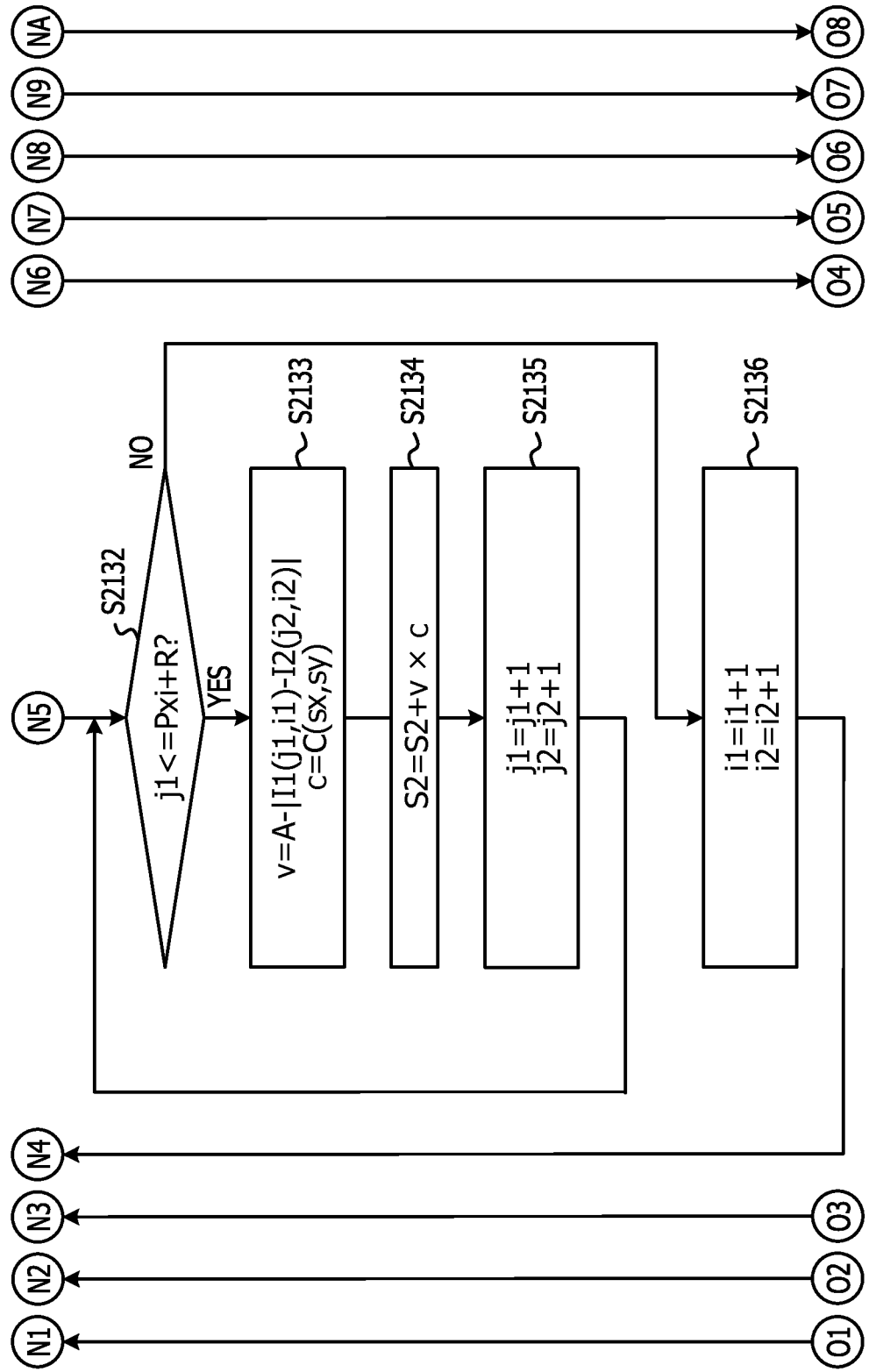
FIG. 29 is a diagram illustrating an example (7) of an operation flow of the matching processing in the matching processing unit 214.
Figure 30:
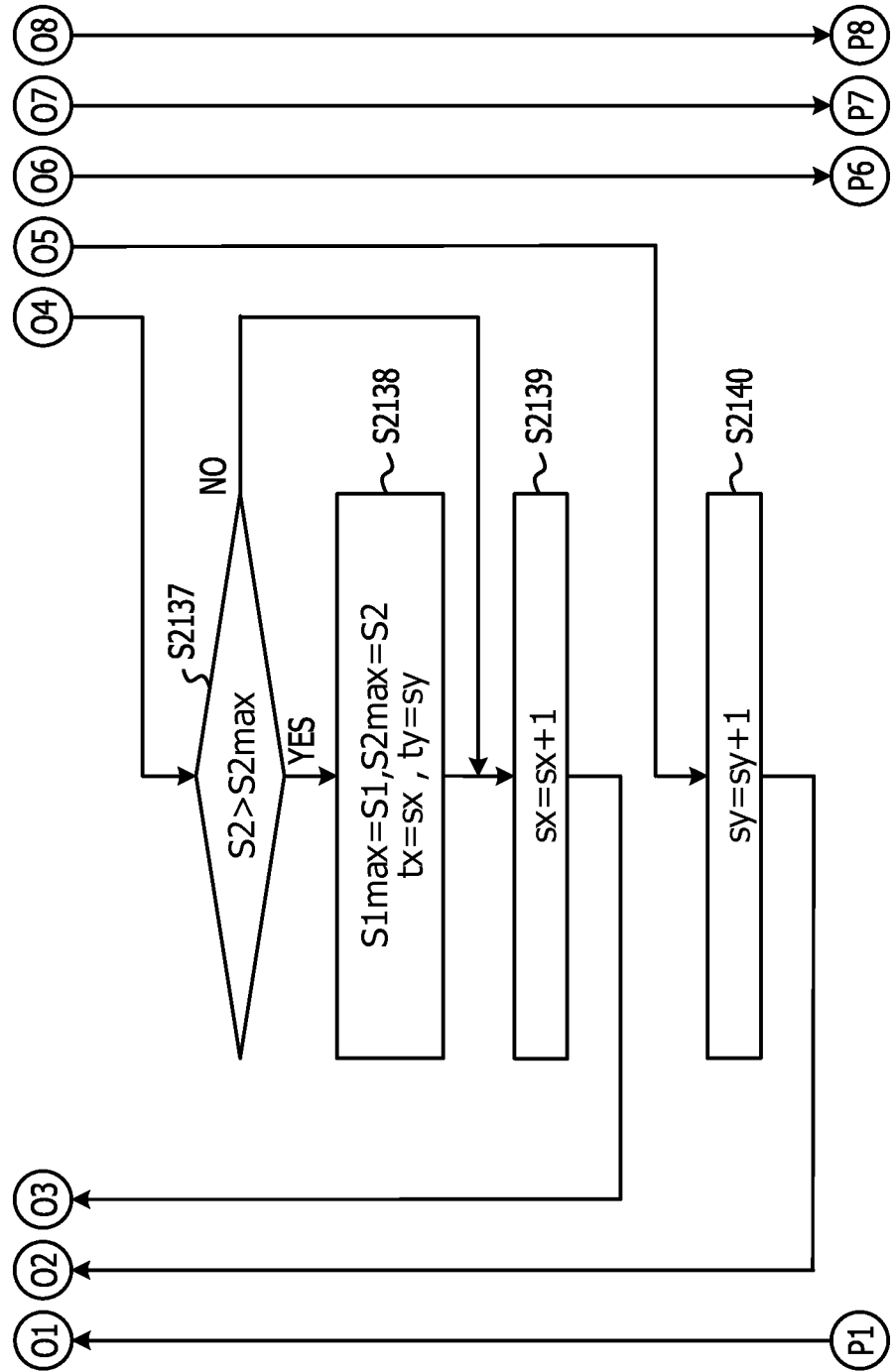
FIG. 30 is a diagram illustrating an example (8) of an operation flow of the matching processing in the matching processing unit 214.
Figure 31:
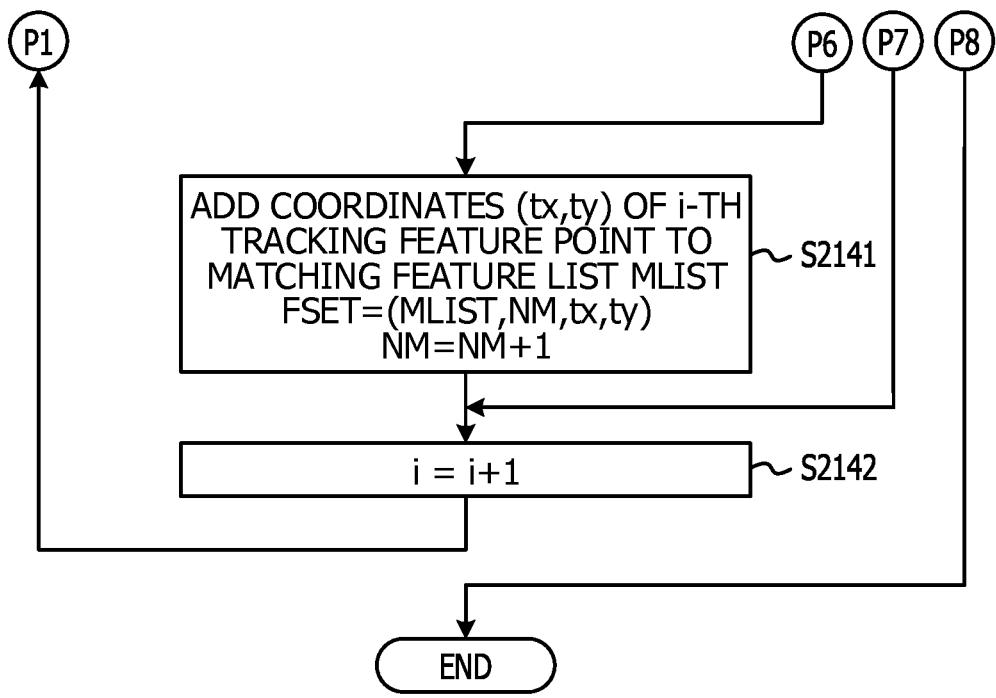
FIG. 31 is a diagram illustrating an example (9) of an operation flow of the matching processing in the matching processing unit 214.

FIG. 23, FIG. 24, FIG. 25, FIG. 26, FIG. 27, FIG. 28, FIG. 29, FIG. 30, and FIG. 31 are diagram illustrating examples of the operation flows of matching processing in the matching processing unit 214. "I1", "I2", and "I3" in FIG. 23 are connected to "I1", "I2", and "I3" in FIG. 24, respectively. "J1", "J2", "J3", "J4", "J5", "J6", and "J7" in FIG. 24 are connected to "J1", "J2", "J3", "J4", "J5", "J6", and "J7" in FIG. 25, respectively. "K1", "K2", "K3", "K4", "K5", "K6", "K7", "K8", and "K9" in FIG. 25 are connected to "K1", "K2", "K3", "K4", "K5", "K6", "K7", "K8", and "K9" in FIG. 26, respectively. "L1", "L2", and "L3" in FIG. 26 are connected to "L1", "L2", and "L3" in FIG. 27, respectively. "M1", "M2", "M3", "M4", "M5", and "M6" in FIG. 27 are connected to "M1", "M2", "M3", "M4", "M5", and "M6" in FIG. 28, respectively. "N1", "N2", "N3", "N4", "N5", "N6", "N7", "N8", "N9", and "NA" in FIG. 28 are connected to "N1", "N2", "N3", "N4", "N5", "N6", "N7", "N8", "N9", and "NA" in FIG. 29, respectively. "O1", "O2", "O3", "O4", "O5", "O6", "O7", and "O8" in FIG. 29 are connected to "O1", "O2", "O3", "O4", "O5", "O6", "O7", and "O8" in FIG. 30, respectively. "P1", "P2", "P3", and "P4" in FIG. 30 are connected to "P1", "P2", "P3", and "P4" in FIG. 31, respectively.

In a step S2101, the tentative tracking processing unit 222 in the matching processing unit 214 assigns 0 to i, and assigns 0 to NM. In a step S2102, the tentative tracking processing unit 222 in the matching processing unit 214 determines whether or not i is less than the number NF of feature points. Here, the tentative tracking processing unit 222 in the matching processing unit 214 confirms whether or not searching is performed for all tracking feature points. In a case where i is greater than or equal to the number NF of feature points (i becomes the number NF of feature points) (S2102: NO), the processing is terminated. In a case where i is less than the number NF of feature points (S2102: YES), the processing proceeds to a step S2103.

In the step S2103, the tentative tracking processing unit 222 in the matching processing unit 214 acquires the coordinates of the i-th tracking feature point from FLIST. FLIST is stored in the feature point DB 212. The tentative tracking processing unit 222 in the matching processing unit 214 defines the acquired coordinates of the tracking feature point as (Pxi,Pyi). The coordinates (Pxi,Pyi) of the i-th tracking feature point, acquired here, are coordinates preceding by one period of time.

In a step S2104, the tentative tracking processing unit 222 in the matching processing unit 214 assigns −1 to S1max, and assigns −1 to S2max. In addition, it is assumed that the predicted position (qx,qy) of the i-th feature point (tracking feature point) at the current time is given as PR(i,Pxi,Pyi). The tentative tracking processing unit 222 in the matching processing unit 214 calculates PR(i,Pxi,Pyi). PR indicates a process for position prediction. In a case where it is assumed that, for example, the position of a tracking feature point preceding by two periods of time is (rx2,ry2) and the position of a tracking feature point preceding by one period of time is (rx1,ry1), the predicted position (qx,qy) is given as qx=rx1+(rx1−rx2) and qy=ry1+(ry1−ry2) or the like, as linearly predicted values. In a case of using no position prediction, it is desirable that qx=Pxi and qy=Pyi are adopted.

In a step S2105, the tentative tracking processing unit 222 in the matching processing unit 214 assigns qy−My to sy. Coordinates (sx,sy) indicate coordinates (a scanning position) currently searched. While centering around the predicted position (qx,qy), the tentative tracking processing unit 222 in the matching processing unit 214 performs searching within the image I2 at the current time with fluctuation ranges of Mx and My in horizontal and vertical directions, respectively. A search range corresponds to a horizontal range, 2Mx, and a vertical range, 2My, centered at the predicted position (qx,qy). The corresponding search range is a search range for tentative tracking.

At the time of searching, while searching within the search range for tentative tracking, the tentative tracking processing unit 222 in the matching processing unit 214 provides a small area of a width, 2R, and a height, 2R, used for video picture comparison and centered at a search (scanning) position (sx,sy) within the search range. The tentative tracking processing unit 222 in the matching processing unit 214 provides a small area whose size is the same as the corresponding small area and which is centered at the tracking position (Pxi,Pyi) of the image I1 at time preceding by one period of time. At each scanning position within the search range, the tentative tracking processing unit 222 in the matching processing unit 214 calculates the degree S1 of video picture coincidence (=a fixed number−an SAD value) within the small area. While scanning within the search range for tentative tracking, the tentative tracking processing unit 222 in the matching processing unit 214 acquires, as a tentative tracking position (mx,my), a position that provides a maximum S1 value. In this regard, however, in a case where the maximum S1 is less than the threshold value TH, coincidence is low and reliability is low as matching. Therefore, the i-th feature point is regarded as a tracking failure, and is not added to the already-matched feature point list MLIST. On the other hand, in a case where the maximum S1 is greater than or equal to the threshold value TH, coincidence is sufficient and reliability is high as matching. Therefore, the processing shifts to real tracking processing at a second step.

Specifically, the tentative tracking processing unit 222 in the matching processing unit 214 performs processing as follows.

In a step S2106, the tentative tracking processing unit 222 determines whether or not sy is less than or equal to qy+My. In a case where sy exceeds qy+My, the coordinates (sx,sy) are located outside the search range. In a case where sy exceeds qy+My (S2106: NO), the processing proceeds to a step S2122. In a case where sy is less than or equal to qy+My (S2106: YES), the processing proceeds to a step S2107. In the step S2107, the matching processing unit 214 assigns qx−Mx to sx.

In a step S2108, the tentative tracking processing unit 222 determines whether or not sx is less than or equal to qx+Mx. In a case where sx exceeds qx+Mx, the coordinates (sx,sy) are located outside the search range. In a case where sx exceeds qx+Mx (S2108: NO), the processing proceeds to a step S2121. In a case where sx is less than or equal to qx+Mx (S2108: YES), the processing proceeds to a step S2109.

In the step S2109, the tentative tracking processing unit 222 assigns 0 to S1. In a step S2110, the tentative tracking processing unit 222 assigns Pyi−R to i1, and assigns sy−R to i2. In a step S2111, the tentative tracking processing unit 222 determines whether or not i1 is less than or equal to Pyi+R. In a case where i1 is greater than Pyi+R (S2111: NO), the processing proceeds to a step S2118. In a case where i1 is less than or equal to Pyi+R (S2111: YES), the processing proceeds to a step S2112.

In the step S2112, the tentative tracking processing unit 222 assigns Pxi−R to j1, and assigns sx−R to j2.

In a step S2113, the tentative tracking processing unit 222 determines whether or not j1 is less than or equal to Pxi+R. In a case where j1 is greater than Pxi+R (S2113: NO), the processing proceeds to a step S2117. In a case where j1 is less than or equal to Pxi+R (S2113: YES), the processing proceeds to a step S2114.

In the step S2114, the tentative tracking processing unit 222 assigns A−|I1(j1,i1)−I2(j2,i2)| to v, and assigns C(sx,sy) to c. "v" is the degree of coincidence of brightness. "c" is the likelihood of being a corner.

In a step S2115, the tentative tracking processing unit 222 assigns S1+v to S1. In a step S2116, the tentative tracking processing unit 222 assigns j1+1 to j1, and assigns j2+1 to j2, and the processing returns to the step S2113.

In the step S2117, the tentative tracking processing unit 222 assigns i1+1 to i1, and assigns i2+1 to i2, and the processing returns to the step S2111.

In the step S2118, the tentative tracking processing unit 222 determines whether or not S1 exceeds S1max. In a case where S1 does not exceed S1max (S2118: NO), the processing proceeds to a step S2120. In a case where S1 exceeds S1max (S2118: YES), the processing proceeds to a step S2119.

In the step S2119, the tentative tracking processing unit 222 assigns S1 to S1max. In addition, the tentative tracking processing unit 222 assigns sx to mx, and assigns sy to my.

In the step S2120, the tentative tracking processing unit 222 assigns sx+1 to sx, and the processing returns to the step S2108.

In the step S2121, the tentative tracking processing unit 222 assigns sy+1 to sy, and the processing returns to the step S2106.

In the step S2122, the tentative tracking processing unit 222 determines whether or not S1max exceeds the predetermined threshold value TH. In a case where S1max does not exceed the predetermined threshold value (S2122: NO), the processing proceeds to a step S2142. In this case, the i-th feature point is regarded as a tracking failure, and is not added to the already-matched feature point list MUST. In a case where S1max exceeds the predetermined threshold value (S2122: YES), the processing proceeds to a step S2123.

Operations in and after the step S2123 correspond to real tracking processing by the real tracking processing unit 224 in the matching processing unit 214. In the real tracking processing, while centering around the tentative tracking position (tentative tracking point) (mx,my), the real tracking processing unit 224 performs searching within the image I2 at the current time with fluctuation ranges of Lx and Ly in horizontal and vertical directions, respectively, (a search range for real tracking). In this regard, however, since it is desirable to search within neighborhood of the tentative tracking position (tentative tracking point), the values of Lx and Ly become smaller than those of Mx and My, respectively. For example, Lx=Ly=1 may be adopted. At the time of searching, while searching within the former search range for real tracking, the real tracking processing unit 224 provides a small area of a width, 2R, and a height, 2R, used for video picture comparison and centered at the position. The real tracking processing unit 224 provides a small area whose size is the same as the corresponding small area and which is centered at the tracking position (Pxi,Pyi) of the image I1 at time preceding by one period of time. At each scanning position within the search range, the real tracking processing unit 224 calculates a sum S2 (the degree of overall coincidence) obtained by multiplying the degree S1 of video picture coincidence (=a fixed number−an SAD value) within the small area by the degree C. of corner at the center position of the small area. While scanning within the former search range for real tracking, the real tracking processing unit 224 acquires, as a real tracking position (tx,ty), a position that provides a maximum S2 value.

In the calculation of the degree S2 of overall coincidence, at the time of obtaining the degree of coincidence at each position within the small area, the real tracking processing unit 224 obtains the degree v of coincidence of brightness and the likelihood c of being a corner. The degree v of coincidence of brightness and the likelihood c of being a corner are obtained as follows.

$$v = A - |I1(j1,i1) - I2(j2,i2)|$$

$$c = C(sx,sy) \qquad \text{[Math. 10]}$$

Here, (j1,i1) indicates a position within the small area in a case where the small area is provided with being centered at the tracking feature point (Pxi,Pyi) preceding by one period of time. (j2,i2) indicates a position within the same small area in search scanning at the current time. (sx,sy) indicates the center position of the search scanning at the current time. In addition, A is a predetermined fixed positive number. I1(x,y) is the brightness value of coordinates (x,y) in the image I1 preceding by one period of time. I2(x,y) is the brightness value of coordinates (x,y) in the image I2 at the current time.

Specifically, the real tracking processing unit 224 in the matching processing unit 214 performs processing as follows.

In the step S2123, the real tracking processing unit 224 assigns −1 to S2max. In a step S2124, the real tracking processing unit 224 assigns my−Ly to sy.

In a step S2125, the real tracking processing unit 224 determines whether or not sy is less than or equal to my+Ly. In a case where sy exceeds my+Ly, the coordinates (sx,sy) are located outside the search range. In a case where sy exceeds my+Ly (S2125: NO), the processing proceeds to a step S2141. In a case where sy is less than or equal to my+Ly (S2125: YES), the processing proceeds to a step S2126. In the step S2126, the matching processing unit 214 assigns mx−Lx to sx.

In a step S2127, the real tracking processing unit 224 determines whether or not sx is less than or equal to mx+Lx. In a case where sx exceeds mx+Lx, the coordinates (sx,sy) are located outside the search range. In a case where sx exceeds mx+Lx (S2127: NO), the processing proceeds to a step S2140. In a case where sy is less than or equal to mx+Lx (S2127: YES), the processing proceeds to a step S2128.

In the step S2128, the real tracking processing unit 224 assigns 0 to S2. In a step S2129, the real tracking processing unit 224 assigns Pyi−R to i1, and assigns sy−R to i2. In a step S2130, the real tracking processing unit 224 determines whether or not i1 is less than or equal to Pyi+R. In a case where i1 is greater than Pyi+R (S2130: NO), the processing proceeds to a step S2137. In a case where i1 is less than or equal to Pyi+R (S2130: YES), the processing proceeds to a step S2131.

In the step S2131, the real tracking processing unit 224 assigns Pxi−R to j1, and assigns sx−R to j2.

In a step S2132, the real tracking processing unit 224 determines whether or not j1 is less than or equal to Pxi+R. In a case where j1 is greater than Pxi+R (S2123: NO), the processing proceeds to a step S2136. In a case where j1 is less than or equal to Pxi+R (S2123: YES), the processing proceeds to a step S2133.

In the step S2133, the real tracking processing unit 224 assigns A−|I1(j1,i1)−I2(j2,i2)| to v, and assigns C(sx,sy) to c. "v" is the degree of coincidence of brightness. "c" is the likelihood of being a corner.

In a step S2134, the real tracking processing unit 224 assigns S2+v×c to S2. In a step S2135, the real tracking processing unit 224 assigns j1+1 to j1, and assigns j2+1 to j2, and the processing returns to the step S2132.

In the step S2136, the real tracking processing unit 224 assigns i1+1 to i1, and assigns i2+1 to i2, and the processing returns to the step S2130.

In the step S2137, the real tracking processing unit 224 determines whether or not S2 exceeds S2max. In a case where S2 does not exceed S2max (S2137: NO), the processing proceeds to a step S2139. In a case where S2 exceeds S2max (S2137: YES), the processing proceeds to a step S2138.

In the step S2138, the real tracking processing unit 224 assigns S1 to S1max, and assigns S2 to S2max. In addition, the real tracking processing unit 224 assigns sx to tx, and assigns sy to ty.

In the step S2139, the real tracking processing unit 224 assigns sx+1 to sx, and the processing returns to the step S2127.

In the step S2140, the real tracking processing unit 224 assigns sy+1 to sy, and the processing returns to the step S2125.

In the step S2141, the real tracking processing unit 224 adds the coordinates (tx,ty) of the i-th tracking feature point to the already-matched feature point list MLIST. NM is a new number assigned to the corresponding feature point. The real tracking processing unit 224 assigns NM+1 to NM, and the processing proceeds to the step S2142.

In the step S2142, the real tracking processing unit 224 assigns i+1 to i, and the processing returns to the step S2102.

Figure 32B:
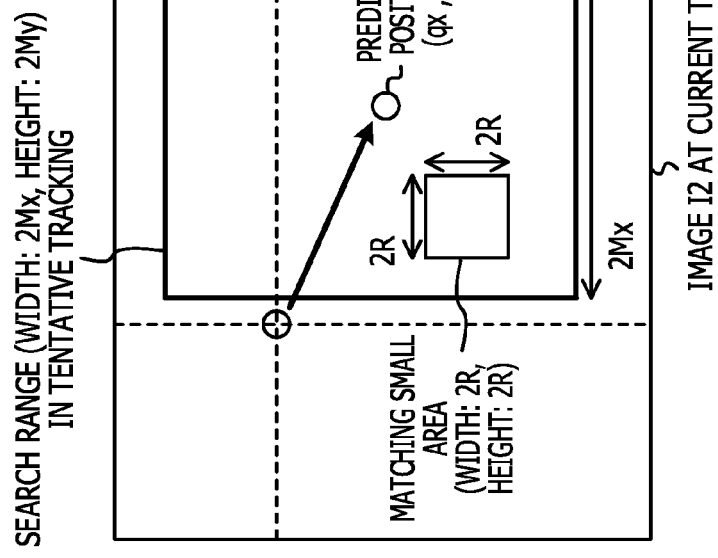
FIGS. 32A and 32B are diagrams illustrating examples of matching ranges in tentative tracking processing.
Figure 32A:
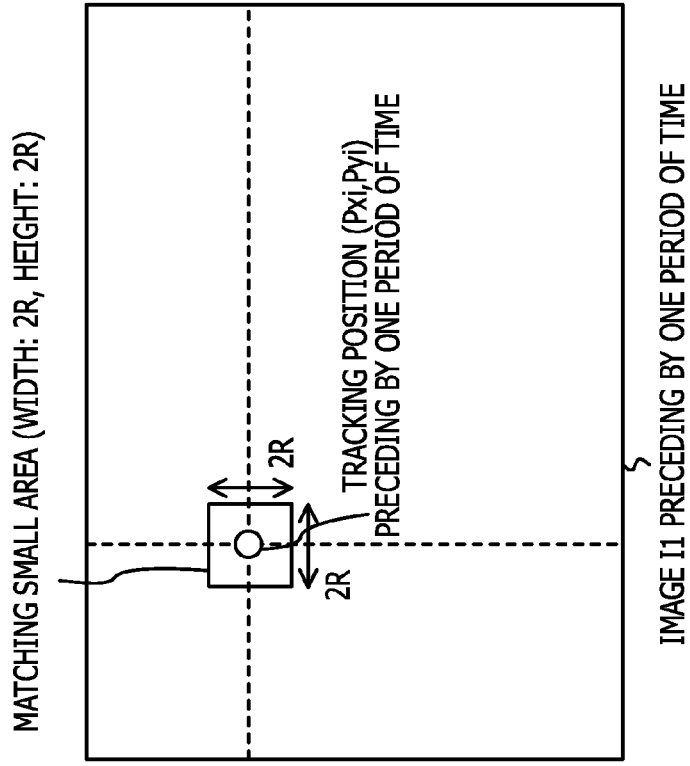

FIGS. 32A and 32B are diagrams illustrating examples of matching ranges in tentative tracking processing. In the example of FIG. 32A, in the image I1 preceding by one period of time, an area of a width, 2R, and a height, 2R, centered at the i-th tracking position (feature point) (Pxi,Pyi) preceding by one period of time is a matching small area. In the image I2 at the current time, an area of a width, 2Mx, and a height, 2My, centered at an i-th predicted position (qx,qy) is a search range in tentative tracking. In addition, an area of a width, 2R, and a height, 2R, which includes a portion of the search range in tentative tracking is a matching small area.

Figure 33B:
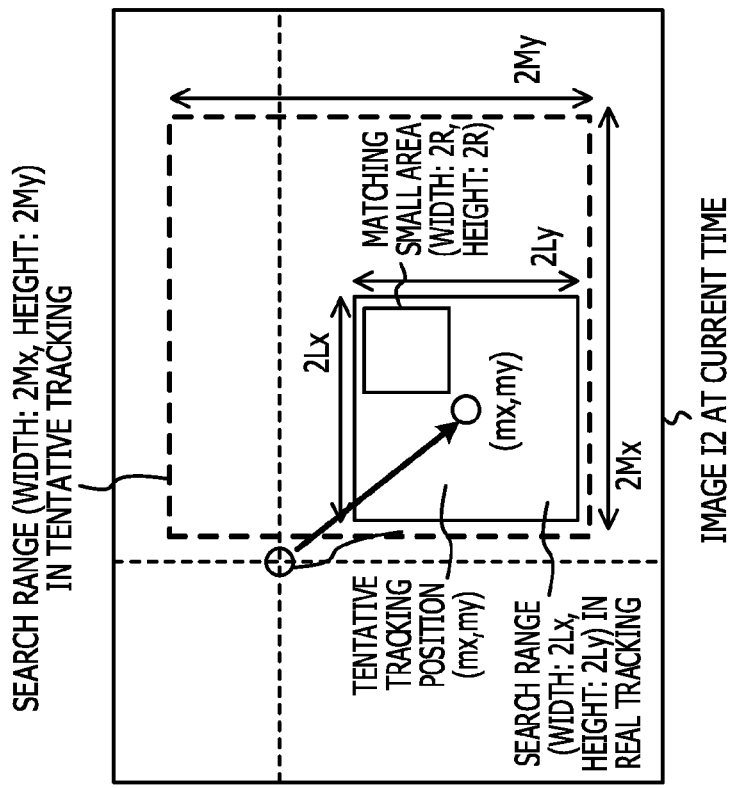
FIGS. 33A and 33B are diagrams illustrating examples of matching ranges in real tracking processing.
Figure 33A:
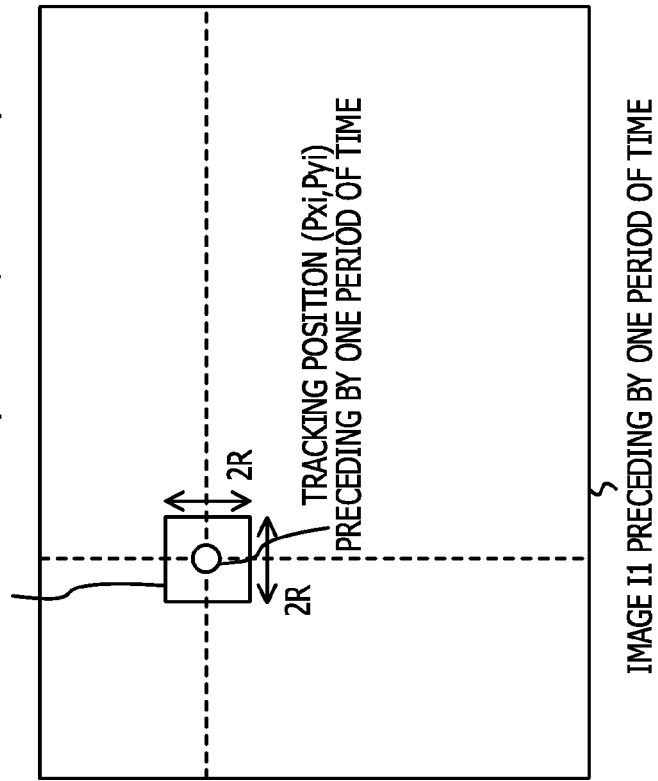

FIGS. 33A and 33B are diagrams illustrating examples of matching ranges in real tracking processing. In the example of FIG. 33A, in the image I1 preceding by one period of time, an area of a width, 2R, and a height, 2R, centered at the i-th tracking position (feature point) (Pxi,Pyi) preceding by one period of time is a matching small area. In the image I2 at the current time, an area of a width, 2Lx, and a height, 2Ly, centered at the i-th tentative tracking position (mx,my) is a search range in real tracking. In addition, an area of a width, 2R, and a height, 2R, which includes a portion of the search range in real tracking is a matching small area. In the image at the current time, an area of a width, 2Mx, and a height, 2My, centered at the i-th predicted position (qx,qy) is a search range in tentative tracking. In addition, an area of a width, 2R, and a height, 2R, which includes a portion of the search range in real tracking is a matching small area.

Deletion processing and addition processing in the feature point addition and deletion unit 210 are the same as the deletion processing and the addition processing, respectively, in the feature point addition and deletion unit 110 of the embodiment 1.

Function Effect of Embodiment 2

The feature point tracking device 200 calculates the degree of coincidence of brightness between a small area centered at a feature point of an image preceding by one period of time and a small area centered at a point within a search range centered at a predicted position of an image at the current time. The feature point tracking device 200 acquires, as a tentative tracking position, a point where the degree of coincidence of brightness is a maximum. Within a predetermined area centered at the tentative tracking position, the feature point tracking device 200 searches for a point where the degree S2 of overall coincidence becomes a maximum, and defines, as a tracking position, the point that obtains the maximum. In other words, the feature point tracking device 200 narrows down, in a stepwise fashion, an area (range) in which the degree of coincidence of brightness is obtained. By reducing the range in which the degree S2 of overall coincidence is calculated, the feature point tracking device 200 is able to reduce a calculation load.

Embodiment 3

Next, an embodiment 3 will be described. The embodiment 3 has a point in common with the embodiment 1 or the embodiment 2. Accordingly, a difference will be mainly described, and the description of the common point will be omitted.

FIG. 34 is a diagram illustrating an example of the configuration of a feature point tracking device of the embodiment 3. A feature point tracking device 300 includes a video picture input unit 302, an edge detection unit 303, a video picture DB 304, a degree-of-corner calculation unit 306, a corner point detection unit 308, a feature point addition and deletion unit 310, a feature point DB 312, and a matching processing unit 314.

The video picture input unit 302 inputs an external video picture image-captured by a camera, converts the external video picture into desired digital video picture data, and sends the digital video picture data to the edge detection unit 303.

The edge detection unit 303 detects vertical and horizontal edges of a video picture, from an input image. The edge detection unit 303 sends the detected edge image to the degree-of-corner calculation unit 306, the matching processing unit 314, and the video picture DB 304.

The video picture DB 304 holds edge image data at current time, and edge image data preceding by one period of time.

The degree-of-corner calculation unit 306 calculates, from the edge image data, the distribution of the degree of corner indicating the likelihood of being a corner at each position in a video picture, and outputs the distribution of the degree of corner to the corner point detection unit 308 and the matching processing unit 314.

The corner point detection unit 308 extracts a corner point (feature point) using the degree-of-corner distribution as an input.

The feature point addition and deletion unit 310 adds a new feature point from an extracted corner point sequence and time-series tracking points stored in the feature point DB 312, and deletes a point unsuitable for tracking.

The feature point DB 312 stores therein a feature point to be tracked in a time-series manner.

With respect to an edge image at the current time and an edge image that is held in the video picture DB 304 and precedes by one period of time, the matching processing unit 314 performs, based on matching processing, tracking on each feature point held in the feature point DB 312, using the two edge images and the degree-of-corner distribution.

The feature point tracking device 300 outputs, to the outside, a tracking result (the position of a feature point within an image) obtained by tracking a feature point within an edge image in a time-series manner.

Example of Operation

Figure 35:
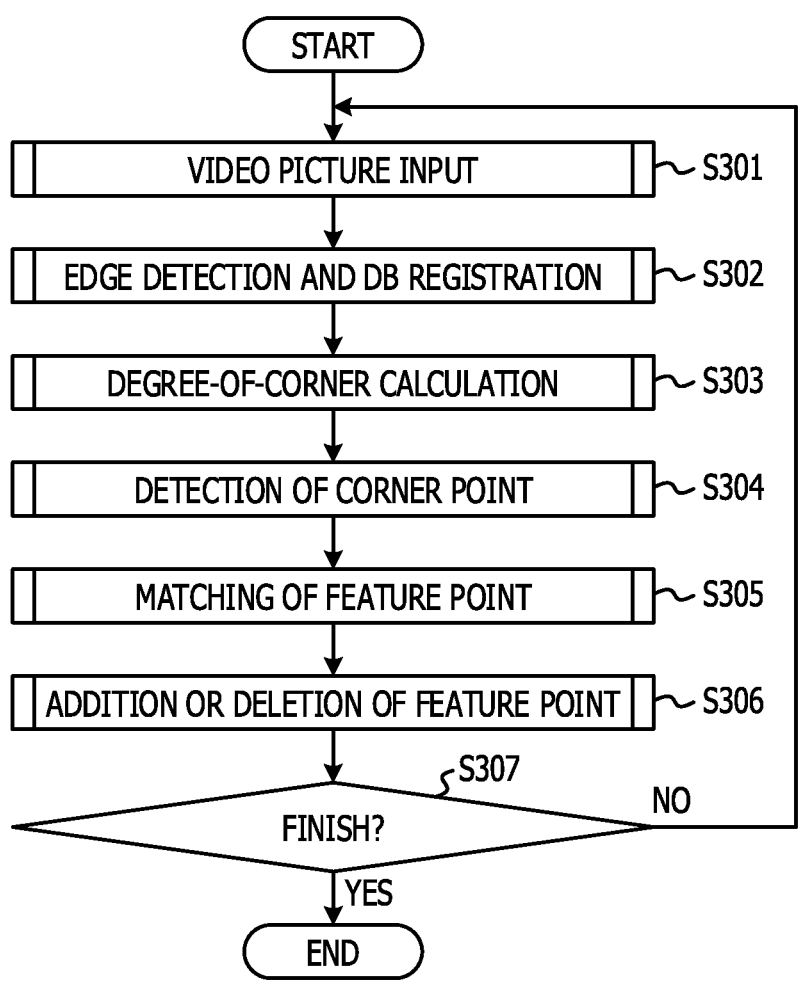
FIG. 35 is a diagram illustrating an example of an operation flow of tracking processing in a time series in a feature point tracking device 300.

FIG. 35 is a diagram illustrating an example of the operation flow of tracking processing in a time series in the feature point tracking device 300.

In a step S301, the video picture input unit 302 in the feature point tracking device 300 acquires a video picture from a camera or the like that image-captures an external world, converts the video picture into a digital video picture, and outputs the digital video picture to a subsequent stage.

In a step S302, the edge detection unit 303 detects an edge from the input video picture, registers an edge image at current time in the video picture DB 304, and outputs the edge image to a next-step processing operation.

In a step S303, the degree-of-corner calculation unit 306 calculates, from the edge image at the current time, the degree of corner indicating the likelihood of being a corner at each position within the video picture, and generates a degree-of-corner distribution. The generated degree-of-corner distribution is sent to the corner point detection unit 308 and the matching processing unit 314.

In a step S304, using the degree-of-corner distribution, the corner point detection unit 308 identifies a point where the degree of corner locally becomes a local maximum, and sends, as a corner point, the identified point to next-stage processing.

In a step S305, the matching processing unit 314 acquires, as video picture information, an input video picture at the current time and a video picture that is held in the video picture DB and precedes by one period of time, and acquires a degree-of-corner distribution obtained in the previous stage processing and tracking feature point information that is held in the feature point DB 312 and prior to time preceding by one period of time. Using the acquired information, the matching processing unit 314 calculates a corresponding position at the current time with respect to a tracking feature point preceding by one period of time, outputs, as a device output, a tracking position (the coordinate values of an image) to the outside of the device, and outputs a tracking result to subsequent stage processing.

The step S304 and the step S305 may be executed in parallel, and the step S305 may be executed in advance.

In a step S306, using, as inputs, a feature point sequence obtained at the current time and obtained in the step S304, and a tracking feature point sequence at the current time, obtained in the step S305, the feature point addition and deletion unit 310 updates the feature point DB 312 by adding a new feature point and deleting a feature point unsuitable for tracking, and prepares for matching processing at subsequent time.

In a step S307, the feature point tracking device 300 determines whether or not inputting of a video picture finishes. In a case where the inputting of a video picture finishes (S307: YES), the processing is terminated. In a case where the inputting of a video picture does not finish (S307: NO), the processing returns to the step S301 and is repeated.

Next, individual processing operations of the operation flow in FIG. 35 will be described in detail.

The video picture input unit 302 performs video picture input processing. The video picture input unit 302 converts a video picture input in a time-series manner, into a desired digital format video picture (digital video picture data), and outputs the digital format video picture to the edge detection unit 303.

In addition, the desired digital format video picture indicates a video picture suitable for calculation of the degree of corner in a subsequent stage, and is, for example, grid-like video picture data having a 8-bit monochrome tone at each position (pixel) in an image.

The edge detection unit 303 calculates, from an input digital video picture indicating a contrasting density, differential values in a vertical direction and a horizontal direction at each point position in the video picture, generates an edge image, and registers the corresponding edge image in the video picture DB 304. The edge detection unit 303 outputs the generated edge image to the degree-of-corner calculation unit 306 and the matching processing unit 314.

The edge detection unit 303 performs differential processing operations in the vertical direction and the horizontal direction, on each point within the input image. While centering around each pixel position within the image, the edge detection unit 303 causes respective differential operators in the vertical direction and the horizontal direction, such as, for example, the Sobel operator, to operate, and calculates differential values in the horizontal direction and the vertical direction (defined as dx(x,y) and dy(x,y), respectively) for each pixel position (x,y). Specifically, in a case where it is assumed that an input image is I(x,y), the horizontal direction differential operator of Sobel is fx(a,b), and the vertical direction differential operator thereof is fy(a,b), the horizontal differential value dx(x,y) and the vertical differential value dy(x,y) at each position (x,y) in the image are obtained in accordance with the following Expressions.

$$dx(x, y) = \sum_{a=-1}^{1} \sum_{b=-1}^{1} (I(x+a, y+b) \cdot fx(a, b))$$ [Math. 11]

$$dy(x, y) = \sum_{a=-1}^{1} \sum_{b=-1}^{1} (I(x+a, y+b) \cdot fy(a, b))$$ [Math. 12]

The horizontal differential operator fx(a,b) is the same as, for example, the horizontal differential operator of Sobel illustrated in FIG. 5. The vertical differential operator fy(a,b) is the same as, for example, the vertical differential operator of Sobel illustrated in FIG. 6. It is desirable that dx(x,y) and dy(x,y) are differential quantities at each pixel position in a video picture, and an operator other than the Sobel operator may be used.

In this way, the edge detection unit 303 outputs a horizontal differential video picture Dx (horizontal direction edge image) having the horizontal differential values dx(x,y) as pixel values. In addition, the edge detection unit 303 outputs a vertical differential video picture Dy (vertical direction edge image) having the vertical differential values dy(x,y) as pixel values. The horizontal direction edge image and the vertical direction edge image are collectively called edge images.

The video picture DB 304 holds pieces of video picture data at two times. In other words, the video picture DB 304 holds edge image data at the current time and edge image data preceding by one period of time. The edge detection unit 303 discards the edge image data "preceding by one period of time" at that point in time, which exists within the video picture DB 304, and moves the edge image data at "the current time" at that point in time within the video picture DB 304, to the edge image data "preceding by one period of time" within the video picture DB 304. Furthermore, the edge detection unit 303 stores new edge image data input at the current time, as edge image data at "the current time" within the video picture DB 304.

The degree-of-corner calculation unit 306 calculates the local integral quantities of differential values. With respect to the position of each point (x,y) in the image, the degree-of-corner calculation unit 306 calculates the following three variable quantities (g11,g12,g22) as the integrated values of a rectangular area of N×N. Using the pixel values dx(x,y) of the horizontal direction edge image Dx and the pixel values dy(x,y) of the vertical direction edge image Dy, the degree-of-corner calculation unit 306 calculates the three variable quantities (g11,g12,g22) in the same way as the degree-of-corner calculation unit 106 in the embodiment 1.

Using the three variable quantities (g11,g12,g22), the degree-of-corner calculation unit 306 calculates the degree of corner C(x,y) with respect to the position of each point (x,y) in the image, as follows. The degree-of-corner calculation unit 306 calculates the degree of corner C(x,y) in the same way as the degree-of-corner calculation unit 106 in the embodiment 1.

The corner point detection unit 308 performs corner point detection processing in the same way as the corner point detection unit 108 in the embodiment 1.

The matching processing unit 314 performs matching processing for a feature point. It is assumed that edge images which are stored in the video picture DB 304 and precede by one period of time are Dx1(x,y) and Dy1(x,y) and edge images at the current time are Dx2(x,y) and Dy2(x,y). In addition, it is assumed that the distribution of the degree of corner for the edge images at the current time obtained in the degree-of-corner calculation unit 306 is C(x,y) and a tracking feature point list prior to time preceding by one period of time, stored in the feature point DB 312, is FLIST. In addition, with the number NF of feature points, FLIST defines FGET(FLIST,i) as an operation for extracting an i-th tracking feature point within the FLIST list. In addition, FGET(FLIST,i) returns the coordinate values (Pxi,Pyi) on an image of the i-th tracking feature point within the FLIST list. In addition, it is assumed that FSET(FLIST,i,x,y) sets the position of the i-th tracking feature point within the FLIST list to (x,y). Here, FLIST is a list of the same format as NLIST.

The operation flow of matching processing in the matching processing unit 314 has a point in common with the operation flow of the matching processing in the matching processing unit 114 in the embodiment 1 (FIG. 8, FIG. 9, FIG. 10, FIG. 11, and FIG. 12). Here, a difference will be described.

In place of the video pictures I1 and I2, the edge images Dx1, Dy1, Dx2, and Dy2 are input to the matching processing unit 314. In addition, in place of the degree v of coincidence of brightness, the degree v of coincidence of an edge shape is used. The degree v of coincidence of the shape of an edge is defined as follows.

$$v=A-(|Dx1(j1,i1)-Dx2(j2,i2)|+|Dy1(j1,i1)-Dy2(j2,i2)|) \quad \text{[Math. 13]}$$

Deletion processing and addition processing in the feature point addition and deletion unit 310 are the same as the deletion processing and the addition processing, respectively, in the feature point addition and deletion unit 110 of the embodiment 1.

(Function Effect of Embodiment 3)

The feature point tracking device 300 generate an edge image from an input image. The feature point tracking device 300 performs the degree-of-corner calculation processing and the matching processing using the edge images. Based on the degree of coincidence of an edge image of a small area and the degree of corner of the center point of the small area, the feature point tracking device 300 calculates the degree of overall coincidence, and tracks a feature point. By defining, as a tracking feature point, the center point of the small area where the degree of coincidence of the edge image of the small area is high and the degree of corner of the center point of the small area is high, the feature point tracking device 300 tracks the feature point.

The likelihood c of being a corner is obtained with respect to the center position (sx,sy) of the set small area, using the degree-of-corner distribution C(x,y), and does not utilize the distribution profile of the degree of corner within the small area. The value of the degree of corner at a point is obtained by evaluating the individual vertical and horizontal differential patterns around the corresponding point, and thus is sensitive to a change in the visibility of a target. In a case where a small area is provided at a position in the degree-of-corner distribution, the distribution pattern of the degree of corner within the small area greatly changes owing to the movement of the target. Therefore, in a case where the degree of corner at every point within the small area is reflected, even if the degree of coincidence of the edge image is large, the degree of corner becomes small, and the degree S2 of overall coincidence is reduced.

On the other hand, as for the degree of corner, even if the pattern shape of a surrounding degree-of-corner distribution is different, a value at each position is meaningful as an index for qualitatively evaluating the likelihood of being a corner. Therefore, the matching processing unit 314 calculates the degree S2 of overall coincidence using the likelihood of being a corner (=a degree as an original corner feature) at the center position (sx,sy) of interest in scanning within the search range. From this, even if a change in the profile of the surrounding degree-of-corner distribution is large, the feature point tracking device 300 is able to define a point that coincides as the pattern of the edge image most of all while maintaining a characteristic as a corner, and is able to perform tracking with a suppressed position deviation, in tracking in a time series.

Embodiment 4

Next, an embodiment 4 will be described. The embodiment 4 has a point in common with the embodiment 1, the embodiment 2, or the embodiment 3. Accordingly, a difference will be mainly described, and the description of the common point will be omitted.

(Example of Configuration)

Figure 36:
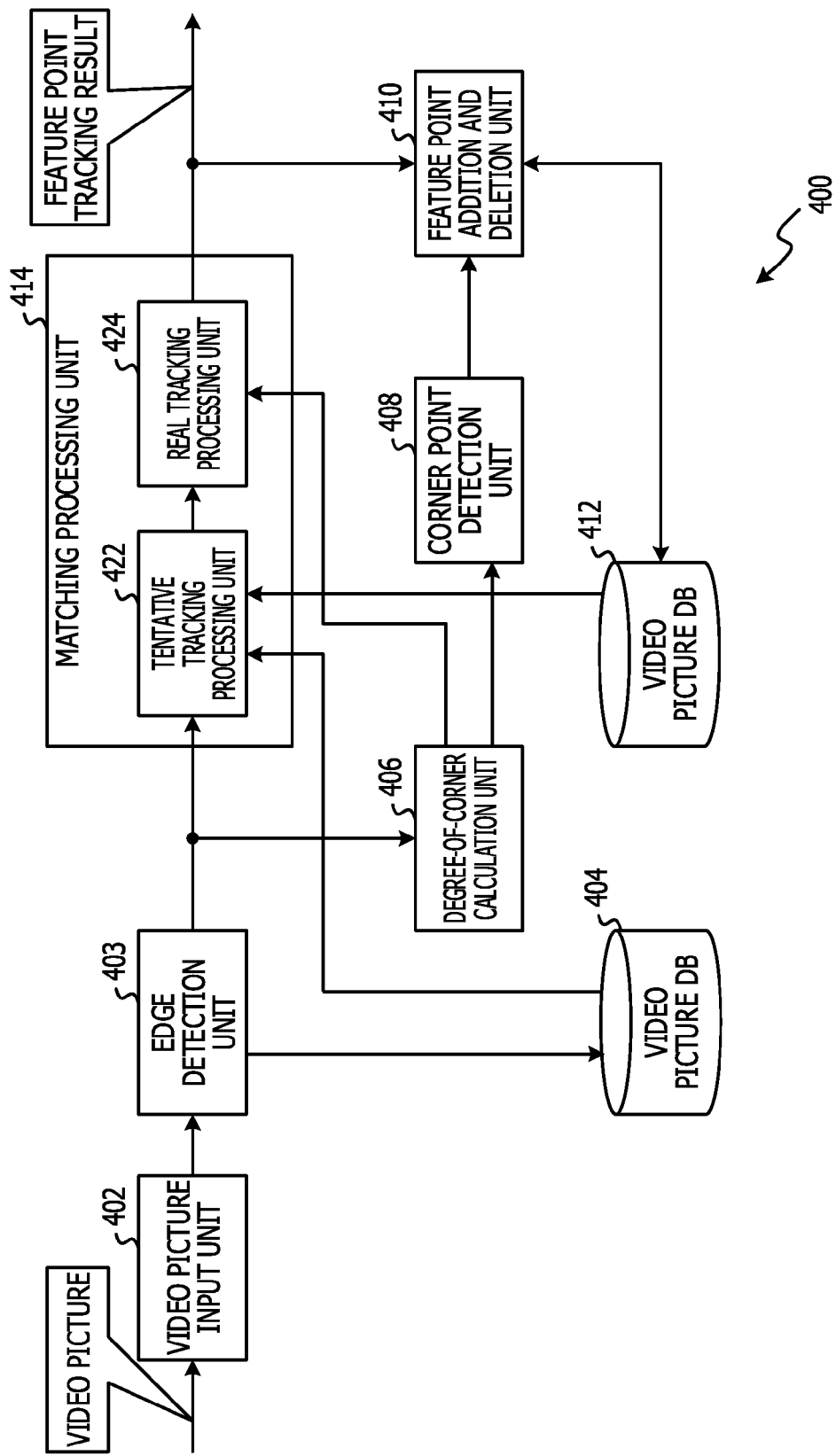
FIG. 36 is a diagram illustrating an example of a configuration of a feature point tracking device of an embodiment 4.

FIG. 36 is a diagram illustrating an example of the configuration of a feature point tracking device of the preset embodiment. A feature point tracking device 400 includes a video picture input unit 402, an edge detection unit 403, a video picture DB 404, a degree-of-corner calculation unit 406, a corner point detection unit 408, a feature point addition and deletion unit 410, a feature point DB 412, and a matching processing unit 414.

The video picture input unit 402 inputs an external video picture image-captured by a camera, converts the external video picture into desired digital video picture data, and sends the digital video picture data to the edge detection unit 403.

The edge detection unit 403 detects vertical and horizontal edges of a video picture, from an input image. The edge detection unit 403 sends the detected edge image to the degree-of-corner calculation unit 406, the matching processing unit 414, and the video picture DB 404.

The video picture DB 404 holds edge image data at current time, and edge image data preceding by one period of time.

The degree-of-corner calculation unit 406 calculates, from the edge image data, the distribution of the degree of corner indicating the likelihood of being a corner at each position in a video picture, and outputs the distribution of the degree of corner to the corner point detection unit 408 and the matching processing unit 414.

The corner point detection unit 408 extracts a corner point (feature point) using the degree-of-corner distribution as an input.

The feature point addition and deletion unit 410 adds a new feature point from an extracted corner point sequence and time-series tracking points stored in the feature point DB 412, and deletes a point unsuitable for tracking.

The feature point DB 412 stores therein a feature point to be tracked in a time-series manner.

The matching processing unit 414 includes a tentative tracking processing unit 422 and a real tracking processing unit 424. Using a video picture preceding by one period of time and a video picture at a current time, the tentative tracking processing unit 422 calculates a tentative tracking corresponding position. Within a local range centered at the tentative corresponding position obtained in the tentative tracking processing unit 422, the real tracking processing unit 424 determines a first-best coincidence point using the video picture preceding by one period of time, the video picture at the current time, and the degree of corner.

The feature point tracking device 400 outputs, to the outside, a tracking result (the position of a feature point within an image) obtained by tracking a feature point within an edge image in a time-series manner.

(Example of Operation)

Figure 37:
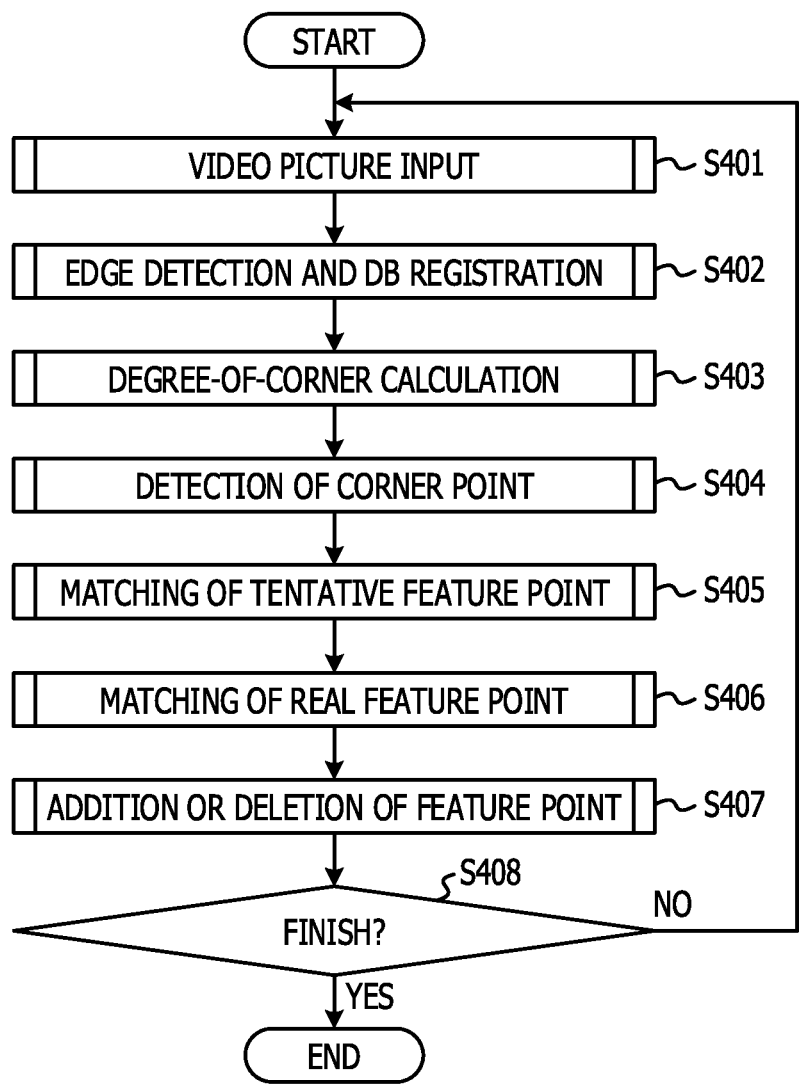
FIG. 37 is a diagram illustrating an example of an operation flow of tracking processing in a time series in a feature point tracking device 400.

FIG. 37 is a diagram illustrating an example of the operation flow of tracking processing in a time series in the feature point tracking device 400.

In a step S401, the video picture input unit 402 in the feature point tracking device 400 acquires a video picture from a camera or the like that image-captures an external world, converts the video picture into a digital video picture, and outputs the digital video picture to a subsequent stage.

In a step S402, the edge detection unit 403 detects an edge from the input video picture, registers an edge image at current time in the video picture DB 404, and outputs the edge image to a next-step processing operation.

In a step S403, the degree-of-corner calculation unit 406 calculates, from the edge image at the current time, the degree of corner indicating the likelihood of being a corner at each position within the video picture, and generates a degree-of-corner distribution. The generated degree-of-corner distribution is sent to the corner point detection unit 408 and the matching processing unit 414.

In a step S404, using the degree-of-corner distribution, the corner point detection unit 408 identifies a point where the degree of corner locally becomes a local maximum, and sends, as a corner point, the identified point to next-stage processing.

In a step S405, the tentative tracking processing unit 422 in the matching processing unit 414 acquires, as video picture information, an input video picture at the current time and an edge image that is held in the video picture DB 404 and precedes by one period of time, and acquires tracking feature point information that is held in the feature point DB 412 and prior to time preceding by one period of time. Using the acquired information, the tentative tracking processing unit 422 calculates, based on the similarity of the video picture information, a tentative corresponding position at the current time with respect to a tracking feature point preceding by one period of time.

In a step S406, the real tracking processing unit 424 in the matching processing unit 414 performs local searching centered at the tentative corresponding position. From the local searching, the real tracking processing unit 424 calculates a real corresponding position at the current time with respect to the tracking feature point preceding by one period of time, based on an overall similarity to which the degree of corner obtained from the degree-of-corner distribution obtained in the previous stage processing is added, in addition to the similarity of the video picture information. The real tracking processing unit 424 outputs, as a device output, a tracking position (the coordinate values of an image) to the outside of the device, and outputs a tracking result to subsequent stage processing.

The step S404, the step S405, and the step S406 may be executed in parallel, and the step S405 and the step S406 may be executed in advance.

In a step S407, the feature point addition and deletion unit 410 receives a feature point sequence obtained at the current time and obtained in the step S404, and a tracking feature point sequence at the current time, obtained in the step S405 and the step S406. Using, as inputs, the feature point sequence and the tracking feature point sequence, the feature point addition and deletion unit 410 updates the feature point DB 412 by adding a new feature point and deleting a feature point unsuitable for tracking, and prepares for matching processing at subsequent time.

In a step S408, the feature point tracking device 400 determines whether or not inputting of a video picture finishes. In a case where the inputting of a video picture finishes (S408: YES), the processing is terminated. In a case where the inputting of a video picture does not finish (S408: NO), the processing returns to the step S401 and is repeated.

Next, individual processing operations of the operation flow in FIG. 37 will be described in detail.

Video picture input processing in the video picture input unit 402 is the same as the video picture input processing in the video picture input unit 302 in the embodiment 3.

Edge detection and DB registration processing in the edge detection unit 403 are the same as the edge detection and the DB registration processing in the edge detection unit 303 in the embodiment 3.

Degree-of-corner calculation processing in the degree-of-corner calculation unit 406 is the same as the degree-of-corner calculation processing in the degree-of-corner calculation unit 306 in the embodiment 3.

The operation flow of matching processing in the matching processing unit 414 has a point in common with the operation flow of the matching processing in the matching processing unit 214 in the embodiment 2 (FIG. 23, FIG. 24, FIG. 25, FIG. 26, FIG. 27, FIG. 28, FIG. 29, FIG. 30, and FIG. 31). Here, a difference will be described.

In place of the video pictures I1 and I2, the edge images Dx1, Dy1, Dx2, and Dy2 are input to the matching processing unit 414. In addition, in place of the degree v of coincidence of brightness, the degree v of coincidence of an edge shape is used. The degree v of coincidence of the shape of an edge is defined as follows.

$$v = A - (|Dx1(j1,i1) - Dx2(j2,i2)| + |Dy1(j1,i1) - Dy2(j2,i2)|) \quad \text{[Math. 14]}$$

Deletion processing and addition processing in the feature point addition and deletion unit 410 are the same as the deletion processing and the addition processing, respectively, in the feature point addition and deletion unit 110 of the embodiment 1.

(Function Effect of Embodiment 4)

The feature point tracking device 400 calculates the degree of coincidence of an edge image between a small area centered at a feature point of an image preceding by one period of time and a small area centered at a point within a search range centered at a predicted position of an image at the current time. The feature point tracking device 400 acquires, as a tentative tracking position, a point where the degree of coincidence of an edge image is a maximum. Within a predetermined area centered at the tentative tracking position, the feature point tracking device 400 searches for a point where the degree S2 of overall coincidence becomes a maximum, and defines, as a tracking position, the point that obtains the maximum. By reducing the range in which the degree S2 of overall coincidence is calculated, the feature point tracking device 400 is able to reduce a calculation load.

As many as possible of the above-mentioned embodiments may be combined and realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a program for tracking a feature point in an image that causes a computer to execute a process, the process comprising:
calculating first values indicating a degree of corner for respective pixels in another image, based on change of brightness values in a horizontal direction and a vertical direction;
calculating second values indicating a degree of similarity between respective areas in the another image and a reference area around the feature point in the image, based on comparison between the respective areas and the reference area;
calculating third values indicating an overall degree of corner and similarity, based on the first values and the second values; and
tracking the feature point by identifying a point in the another image corresponding to the feature point in the image, based on the third values,
wherein the calculating first values indicating the degree of corner calculates the first values indicating the degree of corner in accordance with the following equations:

$$dx(x, y) = \sum_{a=-1}^{1} \sum_{b=-1}^{1} (I(x+a, y+b) \cdot fx(a, b))$$

$$dy(x, y) = \sum_{a=-1}^{1} \sum_{b=-1}^{1} (I(x+a, y+b) \cdot fy(a, b))$$

$$g11(x, y) = \sum_{a=-n}^{n} \sum_{b=-n}^{n} (dx(x+a, y+b) \cdot dx(x+a, y+b))$$

$$g12(x, y) = \sum_{a=-n}^{n} \sum_{b=-n}^{n} (dx(x+a, y+b) \cdot dy(x+a, y+b))$$

$$g22(x, y) = \sum_{a=-n}^{n} \sum_{b=-n}^{n} (dx(x+a, y+b) \cdot dy(x+a, y+b))$$

$$C(x, y) = \frac{g11(x, y) + g22(x, y) - \sqrt{(g11(x, y) - g22(x, y))^2 + (2 \cdot g12(x, y))^2}}{N^2}$$

where
an input image is I(x,y),
dx(x,y) and dx(x,y) are differential values in a horizontal direction and a vertical direction, respectively, for each pixel position (x,y),
the horizontal direction differential operator of Sobel is fx(a,b),
the vertical direction differential operator of Sobel is fy(a,b),
g11, g12 and g22 are variable quantities as integrated values of a rectangular area of N×N,
n indicates a size equivalent to ½ of a size of one side of the rectangular area, and
C(x.y) is the degree of corner.

2. The non-transitory computer-readable medium according to claim 1, wherein the third values are products of the first values and the second values, respectively.

3. The non-transitory computer-readable medium according to claim 1, wherein the identifying identifies the point which has a maximum third value from among the pixels in the another image.

4. The non-transitory computer-readable medium according to claim 1, the process further comprising:
storing information regarding coordinates of the point that is identified into a memory for next tracking.

5. The non-transitory computer-readable medium according to claim 1, the process further comprising:
setting a searching area in the another image based on a position of the feature point in the image, and
wherein the respective areas are set within the searching area.

6. The non-transitory computer-readable medium according to claim 5, wherein the searching area is centered at the position of the feature point or at another position that is predicted based on the position of the feature point.

7. The non-transitory computer-readable medium according to claim 1, wherein the calculating of the second values calculates the second values based on the comparison between respective brightness patterns of the respective areas and a brightness pattern of the reference area.

8. A tracking device for tracking a feature point in an image comprising:
a memory; and
a processor coupled to the memory and configured to:
calculate first values indicating a degree of corner for respective pixels in another image, based on change of brightness values in a horizontal direction and a vertical direction,
calculate second values indicating a degree of similarity between respective areas in the another image and a reference area around the feature point in the image, based on comparison between the respective areas and the reference area,
calculate third values indicating an overall degree of corner and similarity, based on the first values and the second values, and
track the feature point by identifying a point in the another image corresponding to the feature point in the image, based on the third values,
wherein the calculation of first values indicating the degree of corner calculates the first values indicating the degree of corner in accordance with the following equations:

$$dx(x, y) = \sum_{a=-1}^{1} \sum_{b=-1}^{1} (I(x+a, y+b) \cdot fx(a, b))$$

$$dy(x, y) = \sum_{a=-1}^{1} \sum_{b=-1}^{1} (I(x+a, y+b) \cdot fy(a, b))$$

$$g11(x, y) = \sum_{a=-n}^{n} \sum_{b=-n}^{n} (dx(x+a, y+b) \cdot dx(x+a, y+b))$$

$$g12(x, y) = \sum_{a=-n}^{n} \sum_{b=-n}^{n} (dx(x+a, y+b) \cdot dy(x+a, y+b))$$

$$g22(x, y) = \sum_{a=-n}^{n} \sum_{b=-n}^{n} (dx(x+a, y+b) \cdot dy(x+a, y+b))$$

$$C(x, y) = \frac{g11(x, y) + g22(x, y) - \sqrt{(g11(x, y) - g22(x, y))^2 + (2 \cdot g12(x, y))^2}}{N^2}$$

where
an input image is l(x,y),
dx(x,y) and dy(x,y) are differential values in a horizontal direction and a vertical direction, respectively, for each pixel position (x,y),
the horizontal direction differential operator of Sobel is fx(a,b),
the vertical direction differential operator of Sobel is fx(a,b),
g11, g12 and g22 are variable quantities as integrated values of a rectangular area of N×N,
n indicates a size equivalent to ½ of a size of one side of the rectangular area, and
C(x.y) is the degree of corner.

9. The tracking device according to claim 8, wherein the tracking device is mounted on a vehicle, and the image and the another image are captured by a camera that is installed on the vehicle.

10. The tracking device according to claim 8, wherein the third values are products of the first values and the second values, respectively.

11. The tracking device according to claim 10, wherein the identifying identifies the point which has a maximum third value from among the pixels in the another image.

12. The tracking device according to claim 8, wherein the processor is configured to store information regarding coordinates of the point that is identified into a memory for next tracking.

13. The tracking device according to claim 8, wherein
the processor is configured to set a searching area in the another image based on a position of the feature point in the image, and
the respective areas are set within the searching area.

14. The tracking device according to claim 13, wherein the searching area is centered at the position of the feature point or at another position that is predicted based on the position of the feature point.

15. The tracking device according to claim 8, wherein the second values are calculated based on the comparison between respective brightness patterns of the respective areas and a brightness pattern of the reference area.

16. A tracking method executed by a computer for tracking a feature point in an image, the tracking method comprising:
calculating first values indicating a degree of corner for respective pixels in another image, based on change of brightness values in a horizontal direction and a vertical direction;
calculating second values indicating a degree of similarity between respective areas in the another image and a reference area around the feature point in the image, based on comparison between the respective areas and the reference area;
calculating third values indicating an overall degree of corner and similarity, based on the first values and the second values; and
tracking the feature point by identifying a point in the another image corresponding to the feature point in the image, based on the third values,
wherein the calculating first values indicating the degree of corner calculates the first values indicating the degree of corner in accordance with the following equations:

$$dx(x, y) = \sum_{a=-1}^{1} \sum_{b=-1}^{1} (I(x+a, y+b) \cdot fx(a, b))$$

$$dy(x, y) = \sum_{a=-1}^{1} \sum_{b=-1}^{1} (I(x+a, y+b) \cdot fy(a, b))$$

$$g11(x, y) = \sum_{a=-n}^{n} \sum_{b=-n}^{n} (dx(x+a, y+b) \cdot dx(x+a, y+b))$$

$$g12(x, y) = \sum_{a=-n}^{n} \sum_{b=-n}^{n} (dx(x+a, y+b) \cdot dy(x+a, y+b))$$

$$g22(x, y) = \sum_{a=-n}^{n} \sum_{b=-n}^{n} (dx(x+a, y+b) \cdot dy(x+a, y+b))$$

$$C(x, y) = \frac{g11(x, y) + g22(x, y) - \sqrt{(g11(x, y) - g22(x, y))^2 + (2 \cdot g12(x, y))^2}}{N^2}$$

where
- an input image is l(x,y),
- dx(x,y) and dy(x,y) are differential values in a horizontal direction and a vertical direction, respectively, for each pixel position (x,y),
- the horizontal direction differential operator of Sobel is fx(a,b),
- the vertical direction differential operator of Sobel is fy(a,b),
- g11, g12 and g22 are variable quantities as integrated values of a rectangular area of N×N,
- n indicates a size equivalent to ½ of a size of one side of the rectangular area, and
- C(x.y) is the degree of corner.

\* \* \* \* \*